(12) United States Patent
Kaneko et al.

(10) Patent No.: US 11,222,493 B2
(45) Date of Patent: Jan. 11, 2022

(54) DELIVERY SYSTEM, CONTROL METHOD FOR DELIVERY SYSTEM, AND SERVER DEVICE

(71) Applicant: Toyota Jidosha Kabushiki Kaisha, Toyota (JP)

(72) Inventors: Yusuke Kaneko, Nagoya (JP); Masato Endo, Nagakute (JP); Daiki Kaneichi, Nisshin (JP); Shinji Sassa, Ama (JP); Takahiro Shiga, Chiryu (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 16/265,458

(22) Filed: Feb. 1, 2019

(65) Prior Publication Data

US 2019/0244460 A1 Aug. 8, 2019

(30) Foreign Application Priority Data

Feb. 2, 2018 (JP) .............................. JP2018-017343

(51) Int. Cl.
*G07C 9/00* (2020.01)
*G06Q 10/08* (2012.01)

(52) U.S. Cl.
CPC ..... *G07C 9/00896* (2013.01); *G06Q 10/0833* (2013.01); *G07C 2009/0092* (2013.01)

(58) Field of Classification Search
CPC ........ G06Q 10/0833; G07C 2009/0092; G07C 9/00896
See application file for complete search history.

(56) References Cited

U.S. PATENT DOCUMENTS

| 2006/0216966 | A1* | 9/2006 | Selek ...................... B60P 3/007 439/76.2 |
| 2015/0006005 | A1* | 1/2015 | Yu .......................... G06Q 50/28 701/22 |
| 2016/0099927 | A1* | 4/2016 | Oz ........................ G07C 5/0808 726/9 |
| 2016/0284149 | A1* | 9/2016 | Espig ..................... B60R 9/055 |
| 2019/0220000 | A1 | 7/2019 | Ibe |

FOREIGN PATENT DOCUMENTS

| CN | 107006044 A | 8/2017 |
| JP | 2006-336254 A | 12/2006 |
| JP | 2009-269682 A | 11/2009 |
| JP | 6164599 B1 | 7/2017 |
| JP | 2017-200846 A | 11/2017 |
| WO | 2016099623 A1 | 6/2016 |

* cited by examiner

*Primary Examiner* — Sisay Yacob
(74) *Attorney, Agent, or Firm* — Dinsmore & Shohl LLP

(57) ABSTRACT

A delivery system includes a vehicle configured to deliver a package placed in a case that is lockable-unlockable; a storage unit configured to store key information of the case; a receiving unit configured to receive information about a delivery status of the package; and a control unit configured to change a process according to the delivery status of the package, the process performed for the key information of the case.

17 Claims, 17 Drawing Sheets

FIG. 8

DELIVERY MANAGEMENT INFORMATION TABLE

| DELIVERY ID | DELIVERY VEHICLE ID | REQUEST USER ID | COLLECTION PLACE CODE | DELIVERY DESTINATION INFORMATION | RECEIVER INFORMATION | DELIVERY STATUS |
|---|---|---|---|---|---|---|
| H001 | V001 | E001 | P101 | ... | ... | DELIVERY COMPLETED |
| H002 | V002 | E002 | P102 | ... | ... | DURING DELIVERY |
| H003 | V003 | E003 | P103 | ... | ... | DURING DELIVERY |
| H004 | V004 | E004 | P104 | ... | ... | BEFORE DISPATCH |
| H005 | V005 | E005 | P105 | ... | ... | DELIVERY COMPLETED |

FIG. 9

COLLECTION PLACE MANAGEMENT INFORMATION TABLE

| COLLECTION PLACE CODE | STORE NAME | ADDRESS | CONTACT INFORMATION | PROVIDING USER ID |
|---|---|---|---|---|
| P101 | ... | ... | ... | P101-001 |
| P102 | ... | ... | ... | P102- |
| P103 | ... | ... | ... | P103- |
| P104 | ... | ... | ... | P104- |
| P105 | ... | ... | ... | P105- |

FIG. 10

VEHICLE KEY INFORMATION MANAGEMENT TABLE

| VEHICLE ID | DELIVERY ID | USER ID | KEY INFORMATION |
|---|---|---|---|
| V001 | H001 | P101-01 | XXXX |
| V001 | H001, H002 | E001 | YYYY |
| V001 | H002 | P103-01 | ZZZZ |
| V001 | H003 | P104-01 | XXYY |
| V001 | H003 | E005 | YYZZ |

FIG. 11

VEHICLE LOCK-UNLOCK RECORDING TABLE

| VEHICLE ID | LOCK-UNLOCK | TIMESTAMP | USER ID | LOCATION INFORMATION | KEY INFORMATION |
|---|---|---|---|---|---|
| V001 | UNLOCK | ... | P101-01 | P101-01 | XXXX |
| V001 | LOCK | ... | E001 | E001 | YYYY |
| V001 | UNLOCK | ... | P103-01 | P103-01 | ZZZZ |
| V001 | LOCK | H003 | P104-01 | P104-01 | XXYY |

FIG. 12

PACKAGE KEY INFORMATION MANAGEMENT TABLE

| PACKAGE ID | KEY INFORMATION | DELIVERY ID | SECURITY LEVEL | INVALIDATION TIMER |
|---|---|---|---|---|
| B001 | AAAA | H001 | 1 | – |
| B002 | BBBB | H002 | 1 | – |
| B003 | CCCC | H003 | 2 | |
| B004 | DDDD | H004 | 2 | |
| B005 | EEEE | H005 | 2 | |

FIG. 13

| SECURITY LEVEL | CONTENT |
|---|---|
| 1 | MANAGEMENT BY CENTER SERVER |
| 2 | MANAGEMENT BY USER |

DELIVERY SYSTEM, CONTROL METHOD FOR DELIVERY SYSTEM, AND SERVER DEVICE

CROSS-REFERENCE TO RELATED APPLICATIONS

This application claims priority to Japanese Patent Application No. 2018-017343 filed on Feb. 2, 2018, which is incorporated herein by reference in its entirety including the specification, drawings and abstract.

BACKGROUND

1. Technical Field

The disclosure relates to a package delivery system, a control method for the delivery system, and a server device.

2. Description of Related Art

As one of package delivery systems, there is a system configured such that delivery of a package is completed by placing the package into a delivery box installed at a predetermined position (e.g. Japanese Patent No. 6164599 (JP 6164599 B)). The delivery box can be locked and unlocked. The delivery box is locked when the package is placed therein. A receiver unlocks the delivery box using a two-dimensional code and receives the package.

SUMMARY

However, for example, even while the package is being delivered to the delivery box, the receiver's home, or the like, the package is accessible by a plurality of persons so that there is a possibility of theft. For example, when the delivery system uses a freight-passenger vehicle, the possibility of theft increases. Further, in the package delivery, when a delivery box is shared by an unspecified number of persons, the management of a two-dimensional code being key information of the delivery box becomes complicated, and therefore, there is a possibility that the load imposed on the delivery system increases.

The disclosure provides a delivery system that can improve the security of a package during delivery and suppress an increase in the processing load imposed on the management of delivery, and further provides a control method for the delivery system and a server device.

A first aspect of the disclosure is a delivery system including a vehicle configured to deliver a package placed in a case that is lockable-unlockable; a storage unit configured to store key information of the case; a receiving unit configured to receive information about a delivery status of the package; and a control unit configured to change a process according to the delivery status of the package, the process performed for the key information of the case.

The lockable-unlockable case in which the package is placed is, for example, a case such as a cardboard box or a plastic box that can be unloaded from the vehicle and transferred to a receiver of the package. A package compartment in the vehicle, a storehouse provided in the vehicle, or the like can also be taken as the lockable-unlockable case in which the package is placed. Further, the vehicle itself can also be taken as the lockable-unlockable case in which the package is placed. The key information of the case is, for example, a password, an image (one-dimensional code, two-dimensional code, or the like), or binary data. Lockable-unlockable represents lockable or/and unlockable.

According to the first aspect of the disclosure, the case in which the package is placed is lockable, and therefore, for example, by locking the case during delivery by the vehicle, it is possible to improve the security of the package during delivery by the vehicle. Further, since the process performed for the key information of the case is changed according to the delivery status, it is possible to suppress an increase in the load imposed on the system, for example, by changing the process for the key information to a light-load process when the delivery has completed.

In the first aspect of the disclosure, the case in which the package is placed may be a case that is configured to be unloaded from the vehicle and transferred to the receiver of the package. In this case, the control unit may be configured to, when a notification of delivery completion or receipt confirmation of the package is received, transmit the key information of the case to a terminal of the receiver of the package and invalidate the key information stored in the storage unit. Consequently, since it is not necessary to manage the key information of the case on the delivery system side after receiving the notification of delivery completion or receipt confirmation of the package, it is possible to suppress an increase in the load on the delivery system side.

In the first aspect of the disclosure, the case in which the package is placed may be the vehicle itself, a package compartment provided in the vehicle, or a case placed in the vehicle. In this case, the control unit may be configured to transmit the key information of the case to a terminal of a user who loads the package into the case, and to the terminal of the receiver of the package, and the control unit may further be configured to record locking-unlocking of the case when the locking-unlocking of the case is performed by a user other than the receiver of the package. Consequently, for example, when a trouble such as the loss of the package has occurred during delivery, the cause of the occurrence of the trouble can be specified from the record of the locking-unlocking of the case.

In the first aspect of the disclosure, when the case in which the package is placed is the vehicle itself, the package compartment provided in the vehicle, or the case placed in the vehicle, the control unit may be configured to, according to the delivery status of the package, invalidate the key information transmitted to the terminal of the user who loads the package into the case, and to the terminal of the receiver of the package. Consequently, for example, the key information transmitted to the terminal, of the user who loads the package into the case, and to the terminal of the receiver of the package is invalidated when the delivery of the package has completed, so that it is possible to maintain the security of the vehicle.

In the first aspect of the disclosure, when the case in which the package is placed is the vehicle itself, the package compartment provided in the vehicle, or the case placed in the vehicle, the control unit may be configured to delete the record of the locking-unlocking of the case when a notification of delivery completion or receipt confirmation of the package is received. Consequently, since the time period during which the delivery system manages the record of the locking-unlocking of the case is limited to the receipt of the notification of delivery completion or receipt confirmation of the package, it is possible to suppress an increase in the load imposed on the delivery system.

In the first aspect of the disclosure, the vehicle may be configured to perform autonomous driving. When the vehicle is capable of autonomous driving, the possibility is high that a person such as a driver who is obligated to manage the package during delivery is not present in the vehicle or that the vehicle is used as a freight-passenger vehicle, and therefore, for example, the package in the vehicle is easily accessible by a third party who is not obligated to manage the package, so that the possibility of theft or the like increases. However, according to the disclosure, since the package is placed in the lockable-unlockable case, it is possible to suppress theft of the package during delivery by the vehicle capable of autonomous driving.

The delivery system of the disclosure may be composed of one or a plurality of processing devices such as computers. When the delivery system is composed of a plurality of processing devices, the configurations of the delivery system are distributed to the respective processing devices so that the respective processing devices cooperate to realize the processing of the delivery system.

A second aspect of the disclosure relates to a control method for a delivery system. The control method for the delivery system is such that a management device, that manages a vehicle that delivers a package placed in a case that is lockable-unlockable, stores key information of the case into a storage unit, receives information about a delivery status of the package, and changes a process according to the delivery status of the package, the process performed for the key information of the case. The technical ideas disclosed about the above-described delivery system can also be applied to the control method for the delivery system within a range where technical inconsistency does not occur.

A third aspect of the disclosure relates to a server device. The server device includes a storage unit configured to store key information of a case that is lockable-unlockable, the case configured such that a package that is delivered by a vehicle is placed in the case;

a receiving unit configured to receive information about a delivery status of the package; and a control unit configured to change a process according to the delivery status of the package, the process performed for the key information. The technical ideas disclosed about the above-described delivery system can also be applied to the server device within a range where technical inconsistency does not occur.

According to the disclosure, it is possible to improve the security of a package during delivery and suppress an increase in the processing load imposed on the management of delivery.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 8 is a diagram showing one example of a delivery management information table;

FIG. 9 is a diagram showing one example of a collection place management information table;

FIG. 10 is a diagram showing one example of a vehicle key information management table;

FIG. 11 is a diagram showing one example of a vehicle lock-unlock recording table;

FIG. 12 is a diagram showing one example of a package key information management table;

FIG. 13 is a diagram showing one example of the definition of the security level of package key information;

DETAILED DESCRIPTION OF EMBODIMENTS

Hereinafter, an embodiment will be described with reference to the drawings. The configuration of the embodiment described below is by way of example only, and the disclosure is not limited thereto.

EV Palette

In this embodiment, a self-propelled electrically driven vehicle called an electric vehicle (EV) palette cooperates with a computer system on a network to provide various functions or services to a user. An EV palette of this embodiment (hereinafter simply referred to as an "EV palette") is a mobile body capable of autonomous driving and unmanned driving. There are EV palettes having various sizes according to uses. For example, various EV palettes are available, including a small EV palette that can be used instead of a suitcase and a large EV palette that can transport people or goods.

The EV palette includes an information processing device and a communication device for controlling the EV palette, providing a user interface between the EV palette and a user who uses the EV palette, information transmission and reception to and from various servers on a network, and so on. The EV palette cooperates with the various servers on the network to provide the user with functions and services that are created by the various servers on the network, in addition to processing that can be performed by the EV palette alone.

First Embodiment

System Outline

Figure 1:
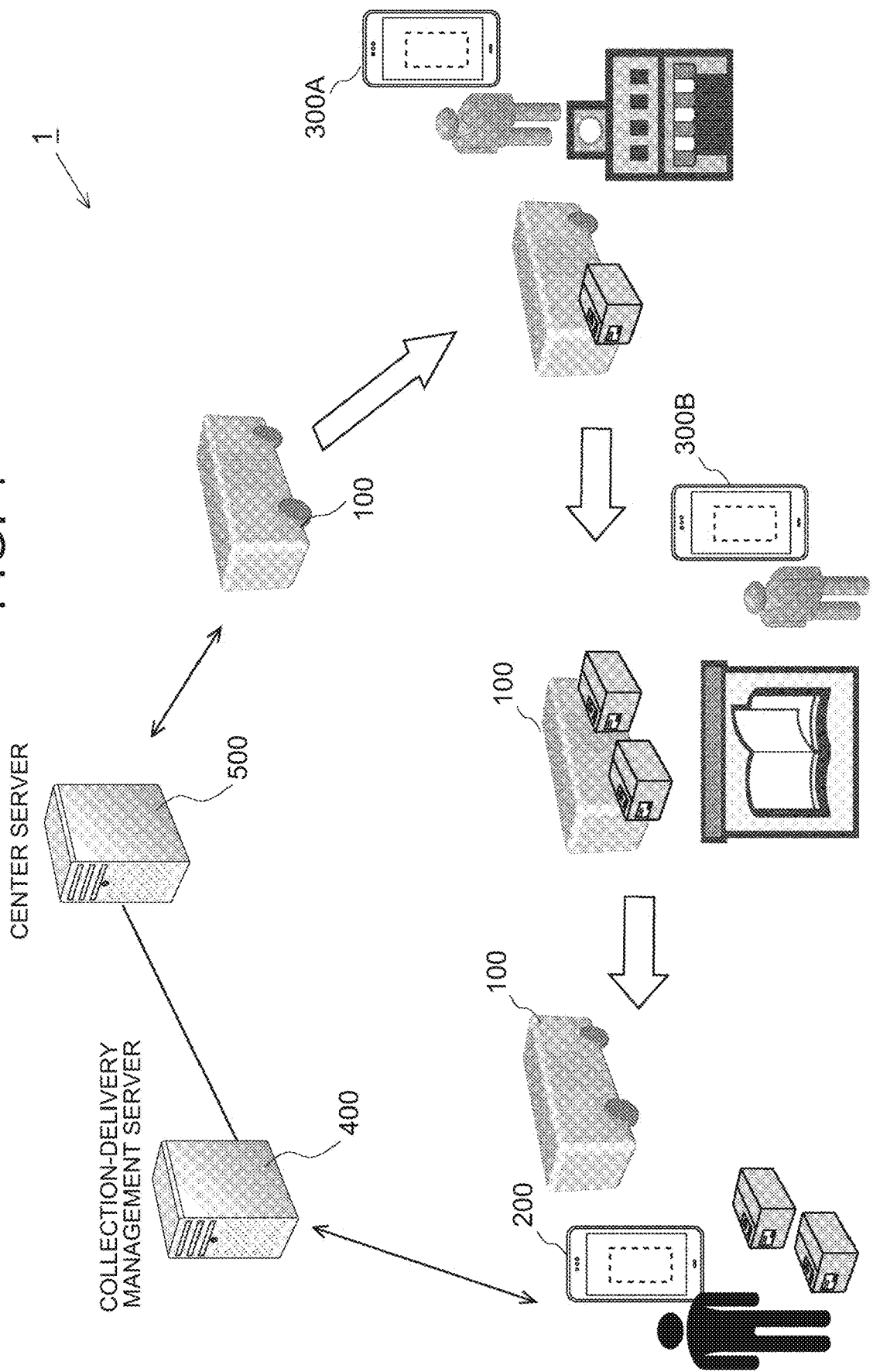
FIG. 1 is a diagram showing one example of the system configuration of a delivery system according to a first embodiment.

FIG. 1 is a diagram showing one example of the system configuration of a delivery system 1 according to a first embodiment. The delivery system 1 is, for example, a system that delivers a product purchased on a product purchase site to a delivery destination. The delivery system 1 includes a plurality of vehicles 100, a center server 500 that manages the vehicles 100, a collection-delivery management server 400 of a delivery company that manages the delivery service, user terminals 200 of users who make delivery requests, and user terminals 300 of users who provide products. Hereinafter, a user who makes a delivery request will be referred to as a "request user". A user who provides a product is, for example, a trader or an employee of a store under contract with a product purchase site.

For example, the vehicles 100 are each connected to the Internet via a wireless communication network and connected to the center server 500 via the Internet. For example, the vehicles 100 each perform wireless communication according to a standard of mobile communication such as 3G, Long Term Evolution (LTE), or LTE-Advanced, or a standard of wireless LAN such as WiFi.

The collection-delivery management server 400 and the center server 500 are connected to each other, for example, via a private line or a virtual private network (VPN). The collection-delivery management server 400 and the center server 500 may be connected to each other, for example, via a public network such as the Internet.

The vehicle 100 is, for example, an EV palette. The EV palette is a mobile body that transports people or goods and is capable of autonomous driving, and unmanned driving. The EV palette has a computer-controlled user interface. The EV palette receives a request from a user, responds to the user, performs predetermined processing in response to the request from the user, and reports the processing results to the user. For example, the EV palette receives a user voice, a user image, or a user command from a computer input-output device and performs processing. The EV palette identifies a user from the user image or voice, or the like and follows the user according to the movement of the user. However, with respect to a request, that cannot be processed by the EV palette alone, in requests from the user, the EV palette notifies it to the center server 500 and performs processing in cooperation with the center server 500. The request that cannot be processed by the EV palette alone may be, for example, acquisition of information from a database on the center server 500, or a request for recognition or inference by a learning machine. The vehicle 100 is not limited to the EV palette and may be, for example, a freight automobile driven by a person.

In response to receipt of an operation: command from the center server 500, the vehicle 100 prepares an operation plan and performs autonomous driving to a destination according to the operation plan. The vehicle 100 includes components for acquiring location information. The vehicle 100 acquires location information every predetermined period and transmits it to the center server 500.

The collection-delivery management server 400 performs the management of the delivery service. More specifically, the collection-delivery management server 400 receives a delivery request for a purchased product from a user terminal 200, for example, via a server that manages a product purchase site. For example, when using the vehicle 100 for the delivery request from the user terminal 200, the collection-delivery management server 400 transmits a delivery request to the center server 500.

The center server 500 performs the management of the vehicles 100. More specifically, when the center server 500 has received the delivery request to be performed by the vehicle 100 from the collection-delivery management server 400, the center server 500 selects the vehicle 100 that performs the delivery, and transmits an operation command to the selected vehicle 100 that commands the selected vehicle 100 to stop at a collection place of the purchased product, load the purchased product at the collection place, and move to a delivery destination. In the first embodiment, when a plurality of products is purchased by a request user and the products are kept in a plurality of stores (collection places), the service is treated as one delivery service per collection place and an operation command is prepared to command the vehicle 100 to stop at the respective collection places.

In response to receipt of the operation command from the center server 500, the vehicle 100 calculates an operation route, starts the operation, loads the packages at the respective collection places, and delivers the packages to the delivery destination. In the first embodiment, it is assumed that the vehicle 100 that performs delivery is the delivery-dedicated EV palette. Therefore, a door of the vehicle 100 is locked for preventing theft of a loaded package. The door of the vehicle 100 can be locked and unlocked using key information. A providing user at a collection place or a receiver who receives a package at a delivery destination locks-unlocks the door of the vehicle 100 using key information and loads or unloads the package. In the first embodiment, the package is placed in an accommodation case equipped with a locking-unlocking device and delivered. The locking-unlocking device can be locked and unlocked using key information.

In the first embodiment, the center server 500 also performs the management of key information of the vehicles 100 and key information of the package accommodation cases. For example, when the center server 500 has transmitted an operation command, that commands delivery of a package, to the vehicle 100, the center server 500 regards it as the start of delivery and transmits key information of the vehicle 100 to a user terminal 300 of a providing user and a user terminal of a receiver. When the center server 500 detects the completion of the delivery of the package, the center server 500 performs a process for invalidating the key information of the vehicle. 100 to the user terminal 300 of the providing user and the user terminal of the receiver.

The center server 500 changes the security level of each of key information of the vehicle 100 and key information of a package according to a package delivery status. For example, notification is made from the vehicle 100 to the center server 500 every time the door of the vehicle 100 is locked or unlocked. For example, in the first embodiment, when locking-unlocking of the vehicle 100 is performed by a user other than a receiver for loading a package into the vehicle 100 at a collection place, the center server 500 makes a high security level reaction to record a log for key information of the vehicle 100. On the other hand, for example, when locking-unlocking of the vehicle 100 is performed by a receiver for unloading a package from the vehicle 100 at a delivery destination, the center server 500 makes a low security level reaction not to record a log.

In the first embodiment, for key information of a package, the center server 500, for example, makes a high security level reaction to hold the key information of the package until the package has been delivered. When the center server 500 detects the completion of the delivery of the package, the center server 500 makes a low security level reaction to transmit the key information of the package to a user terminal of a receiver so as to shift the management of the key information of the package to the receiver. In this way, by changing the security level of the key information according to the package delivery status, the load imposed on the key information management of the center server 500 is reduced while suppressing theft of the package during delivery. It may be assumed that a request user of delivery of a package and a receiver thereof are different from each other or the same. In the first embodiment, for convenience, a receiver may be referred to as a request user assuming that the request user and the receiver are the same.

Figure 2:
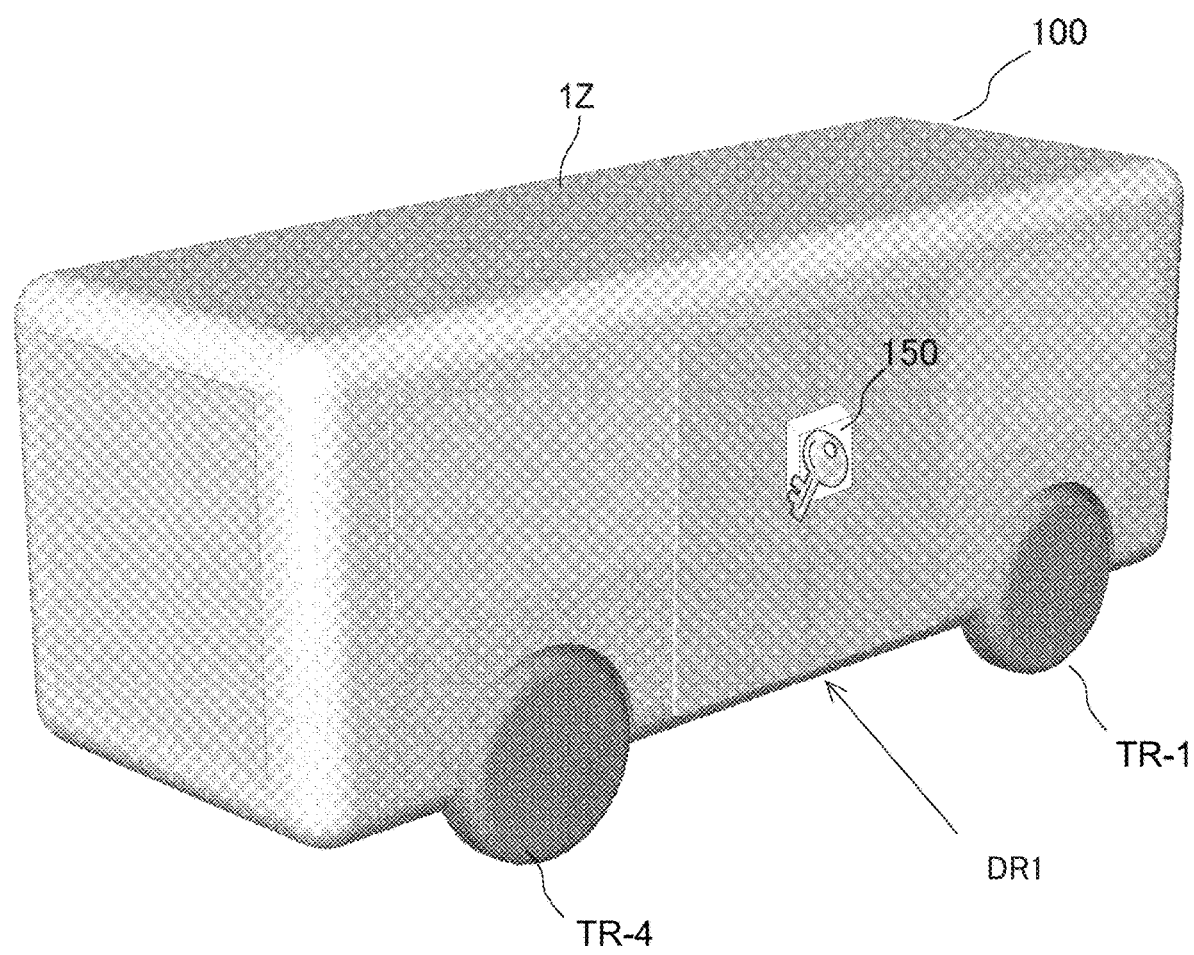
FIG. 2 is a diagram showing one example of the external appearance of a vehicle.
Figure 3:
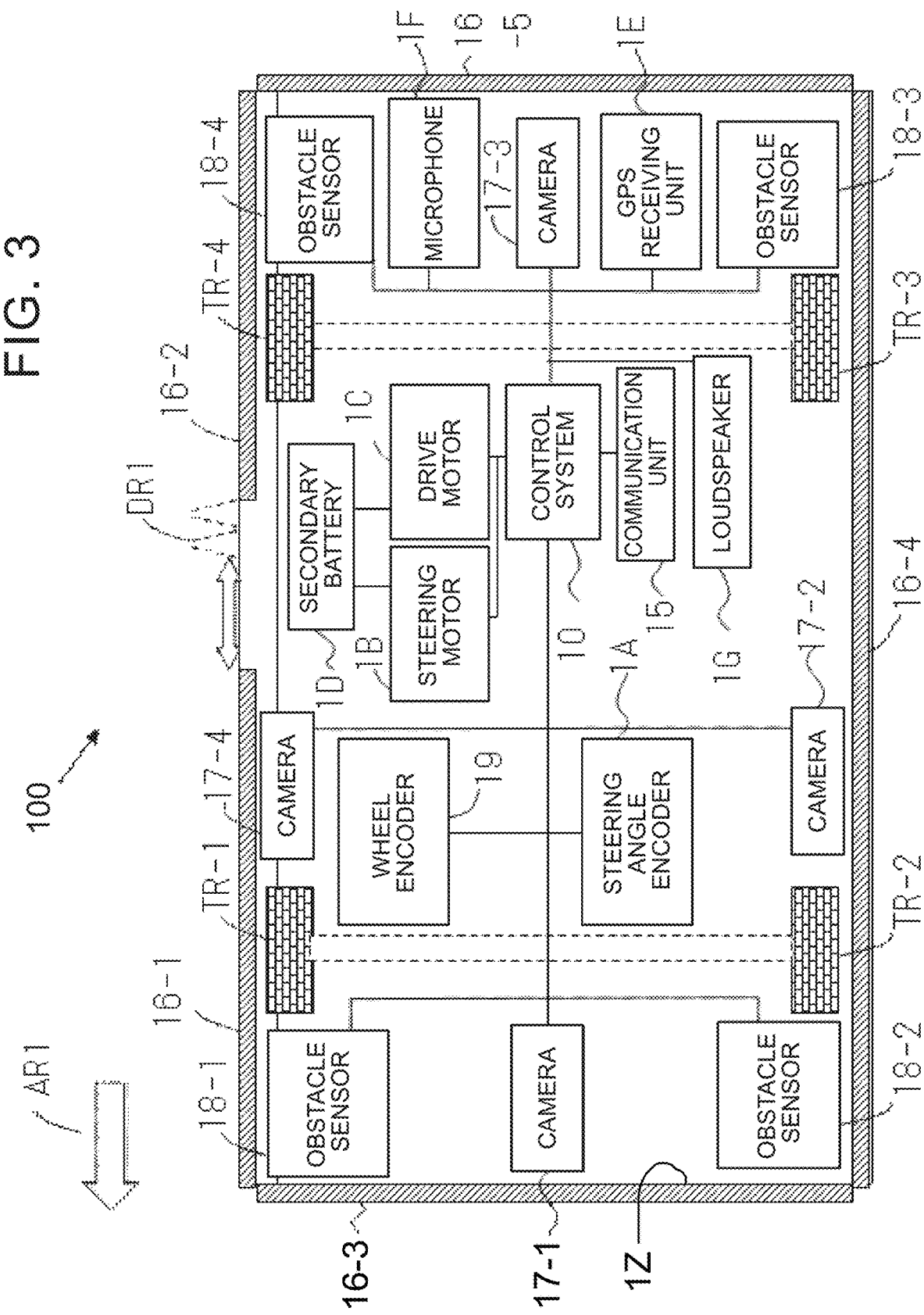
FIG. 3 is a diagram showing one example of the hardware configuration of the vehicle.
Figure 4:
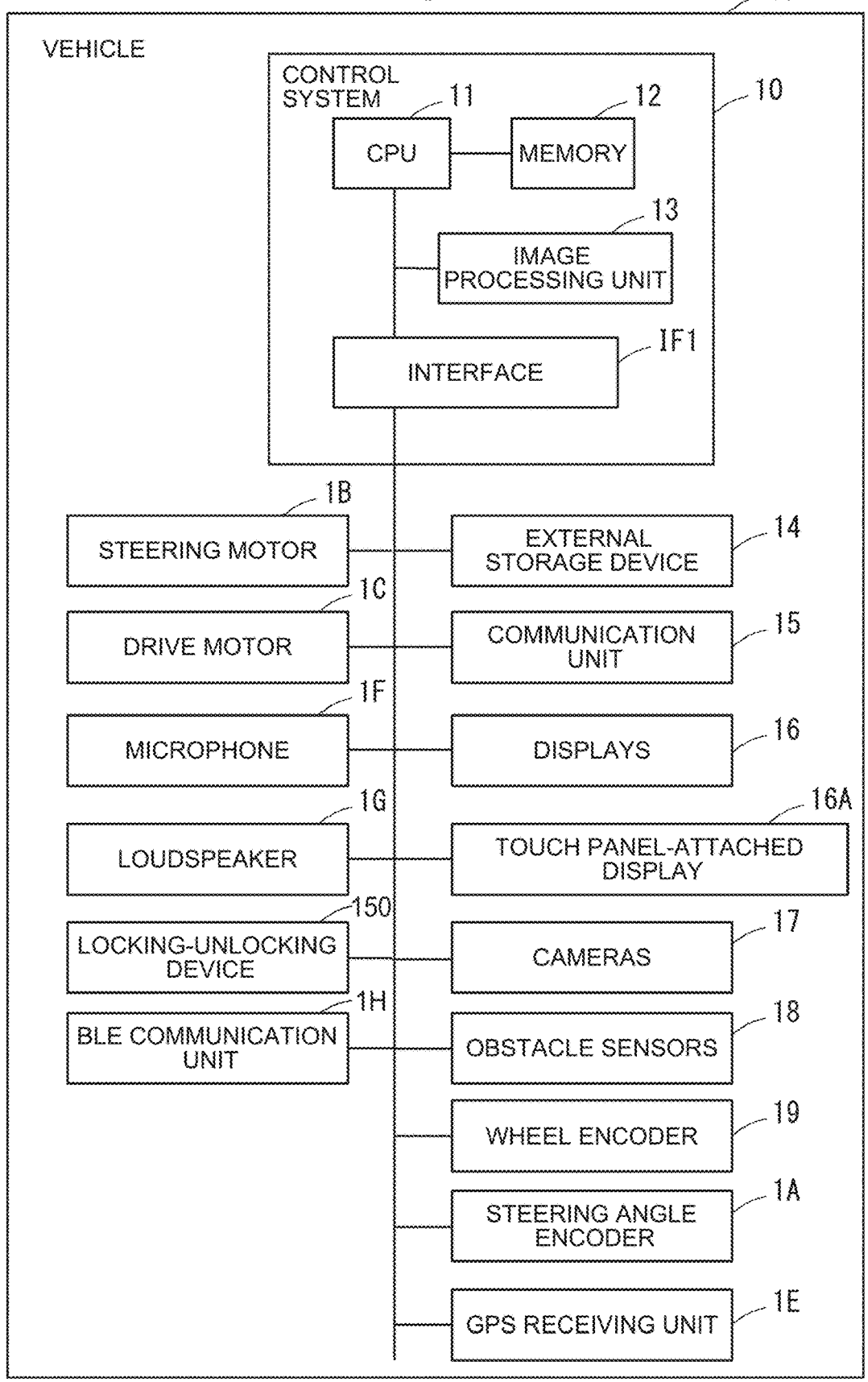
FIG. 4 is a diagram showing one example of the hardware configurations of a control system and respective portions associated with the control system that are installed in an EV palette.

FIG. 2 is a diagram showing one example of the external appearance of the vehicle 100. FIG. 3 is a diagram showing one example of the hardware configuration of the vehicle 100. FIG. 4 is a diagram showing one example of the hardware configurations of a control system 10 and respective portions associated with the control system 10 that are installed in the EV palette. FIGS. 2 to 4 are diagrams in the case where the EV palette is employed as the vehicle 100. In FIGS. 2 to 4, the vehicle 100 will be described as the EV palette 100.

In FIG. 2, a door DR1 of the EV palette 100 is equipped with a locking-unlocking device 150. The locking-unlocking device 150 locks-unlocks the door DR1, for example, when key information is input and the input key information coincides with key information registered in advance. The key information is input, for example, from an input device provided to the locking-unlocking device 150. For example, the key information of the vehicle 100 is a numeric password of a predetermined number of digits, and the input device provided to the locking-unlocking device 150 is a numeric keypad. For example, the key information of the vehicle 100 is a two-dimensional code such as a QR code (registered trademark), and the input device provided to the locking-unlocking device 150 is a camera. The locking-unlocking device 150 includes, for example, a receiver for short-range communication such as NFC, and the key information may be, for example, transmitted from a user terminal to the locking-unlocking device 150 by short-range communication. The key information is, for example, biometric information, and the input device provided to the locking-unlocking device 150 is an infrared camera (in the case of vein authentication) or a fingerprint sensor (in the case of fingerprint authentication).

In the EV palette 100, a portion where the locking-unlocking device 150 is provided is not limited to the door. For example, in the case where the EV palette 100 is not an EV palette dedicated in package delivery and where the EV palette 100 includes a package compartment and a seat for a passenger to sit on and a package to be delivered is placed in the package compartment, the locking-unlocking device 150 is provided to a door of the package compartment so that it is not necessary to provide the locking-unlocking device 150 to the door of the EV palette 100. For example, in the case where a storehouse is provided in the EV palette 100 and a package to be delivered is placed in the storehouse, the locking-unlocking device 150 is provided to a door of the storehouse so that it is not necessary to provide the locking-unlocking device 150 to the door of the EV palette 100. The vehicle 100 is one example of "a vehicle that delivers a package". In the case where the locking-unlocking device 150 is provided to the door DR1 of the vehicle 100 and the vehicle 100 is used exclusively for package delivery, the vehicle 100 is one example of "a lockable-unlockable case". In the case where the locking-unlocking device 150 is provided to the package compartment of the vehicle 100, the package compartment of the vehicle 100 is one example of "a lockable-unlockable case". In the case where the locking-unlocking device 150 is provided to the storehouse, a storage rack, or the like provided in the vehicle 100, the storehouse, the storage rack, or the like provided in the vehicle 100 is one example of "a lockable-unlockable case".

The EV palette 100 includes a box-shaped body 1Z and four wheels TR-1 to TR-4 provided on the front and rear sides, in the travel direction, of a lower portion of the body 1Z on both lateral sides thereof. The four wheels TR-1 to TR-4 are coupled to a drive shaft (not shown) and driven by a drive motor 1C shown in FIGS. 3 and 4. The travel direction of the four wheels TR-1 to TR-4 during traveling (the direction parallel to the rotating surfaces of the four wheels TR-1 to TR-4) is changed relative to the body 1Z by a steering motor 1B shown in FIGS. 3 and 4 so that the travel direction is controlled.

As shown in FIG. 3, displays 16-1 to 16-5 are fixed to an outer wall of the body 1Z of the EV palette 100. The displays 16-1 to 16-5 are, for example, liquid-crystal displays or electroluminescent panels. The displays 16-1 to 16-5 will be collectively referred to as the displays 16 when not distinguishing them individually.

Now it is assumed that the EV palette 100 is traveling in the direction of arrow AR1 in FIG. 3. Therefore, it is assumed that the left direction in FIG. 3 is the travel direction. Accordingly, in FIG. 3, the side of the body 1Z in the travel direction will be referred to as the front side of the EV palette 100, and the side of the body 1Z in the direction opposite to the travel direction will be referred to as the rear side of the EV palette 100. Further, the side of the body 1Z on the right side in the travel direction will be referred to as the right side of the EV palette 100, and the side of the body 1Z on the left side in the travel direction will be referred to as the left side of the EV palette 100.

As shown in FIG. 3, the EV palette 100 includes obstacle sensors 18-1, 18-2 at positions near both side corners on the front side and obstacle sensors 18-3, 18-4 at positions near both side corners on the rear side. Further, the EV palette 100 includes cameras 17-1, 17-2, 17-3, 17-4 on the front side, the left side, the rear side, and the right side, respectively. In this embodiment, the obstacle sensors 18-1, 18-2, 18-3, 18-4 will be collectively referred to as the obstacle sensors 18 when not distinguishing them individually. In this embodiment, the cameras 17-1, 17-2, 17-3, 17-4 will be collectively referred to as the cameras 17 when not distinguishing them individually.

The EV palette 100 includes the steering, motor 1B, the drive motor 1C, and a secondary battery 1D that supplies electric power to the steering motor 1B and the drive motor 1C. The EV palette 100 further includes a wheel encoder 19 that sequentially detects the rotation angle of the wheel, and a steering angle encoder 1A that detects the steering angle being the travel direction of the wheel. Further, the EV palette 100 includes the control system 10, a communication unit 15, a GPS receiving unit 1E, a microphone 1F, and a loudspeaker 1G. Although not shown, the secondary battery 1D also supplies electric power to the control system 10 and so on. However, a power supply that supplies electric power to the control system 10 and so on may be provided separately from the secondary battery 1D that supplies electric power to the steering motor 1B and the drive motor 1C.

The control system 10 is also called an engine control unit (ECU). As shown in FIG. 4, the control system 10 includes a CPU 11, a memory 12, an image processing unit 13, and an interface IF1. An external storage device 14, the communication unit 15, the displays 16, a touch panel-attached display 16A, the cameras 17, the obstacle sensors 18, the wheel encoder 19, the steering angle encoder 1A, the steering motor 1B, the drive motor 1C, the GPS receiving unit 1E, the microphone 1F, the loudspeaker 1G, a BLE communication unit 1H, the locking-unlocking device 150, and so on are connected to the interface IF1.

The obstacle sensor 18 is an ultrasonic sensor, a radar, or the like. The obstacle sensor 18 emits ultrasonic waves, electromagnetic waves, or the like in a detection object direction and detects the presence, location, relative speed and so on of an obstacle in the detection object direction based on reflected waves.

The camera 17 is an imaging device formed by an image sensor such as a charge-coupled device (CCD) image sensor, a metal-oxide-semiconductor (MOS) image sensor, or a complementary metal-oxide-semiconductor (CMOS) image sensor. The camera 17 captures an image every predetermined time interval called frame period and stores the captured image into a frame buffer (not shown) in the control system 10. An image stored into the frame buffer every frame period is called frame data.

According to a command signal from the control system 10, the steering motor 1B controls the direction of a line of intersection between the rotating surface of the wheel and the horizontal plane, i.e. the angle that is a travel direction caused by the rotation of the wheel. According to a command signal from the control system 10, the drive motor 1C drives and rotates, for example, the wheels TR-1 to TR-4. Of the wheels TR-1 to TR-4, the drive motor 1C may drive the pair of wheels TR-1, TR-2 or the other pair of wheels TR-3, TR-4. The secondary battery 1D supplies electric power to the steering motor 1B, the drive motor 1C, and the components connected to the control system 10.

The steering angle encoder 1A detects the direction of a line of intersection between the rotating surface of the wheel and the horizontal plane (or the angle of a rotary shaft of the wheel in the horizontal plane), which is a travel direction caused by the rotation of the wheel, every predetermined detection time interval and stores it into a register (not shown) in the control system 10. For example, in FIG. 3, the direction in which the rotary shaft of the wheel is perpendicular to the travel direction (the direction of arrow AR1) is set as the origin of the angle. The wheel encoder 19 acquires the rotational speed of the wheel every predetermined detection time, interval and stores it into a register (not shown) in the control system 10.

The communication unit 15 is, for example, a communication unit for communicating with various servers and so forth on a network via a mobile phone base station and a public communication network connected to the mobile, phone base station. The communication unit 15 performs wireless communication using wireless signals and a wireless communication system according to a predetermined wireless communication standard.

The global positioning system (GPS) receiving unit 1E receives radio waves of time signals from a plurality of global positioning satellites in orbit around the earth and stores them into a register (not shown) in the control system 10. The microphone 1F detects voice, converts it into a digital signal, and stores it into a register (not shown) in the control system 10. The loudspeaker 1G is driven by a D/A converter and an amplifier connected to the control system 10 or a signal processing unit (not shown) and reproduces audio containing sound and voice.

The CPU 11 in the control system 10 executes a computer program stored in the memory 12 in an executable manner so as to perform the processing as the control system 10. The memory 12 stores therein a computer program to be executed by the CPU 11, data to be processed by the CPU 11, and so on. The memory 12 is, for example, a dynamic random-access memory (DRAM), a static random-access memory (SRAM), or a read-only memory (ROM). The image processing unit 13 cooperates with the CPU 11 and processes data of the frame buffer that is acquired from the camera 17 every predetermined frame period. The image processing unit 13 includes, for example, a GPU and an image memory that serves as a frame buffer. The external storage device 14 is a nonvolatile storage device and is, for example, a solid-state drive (SSD) or a hard disk drive.

For example, as shown in FIG. 4, the control system 10 acquires detection signals from the respective sensors of the EV palette 100 via the interface IF1. Further, the control system 10 calculates latitude and longitude representing, a position on the earth based on detection signals from the GPS receiving unit 1E. Further, the control system 10 acquires map data from a map information database stored in the external storage device 14 and collates the calculated latitude and longitude with a position on the map data, thereby determining a current location. Further, the control system 10 acquires a route from the current location to a destination on the map data. Further, the control system 10 detects obstacles around the EV palette 100 based on signals from the obstacle sensors 18, the cameras 17, and so on. The control system 10 determines the travel direction and controls the steering angle so as to avoid the obstacles.

Further, the control system 10 cooperates with the image processing unit 13 and processes an image acquired from the camera 17 per frame data. For example, the control system 10 detects a change based on difference between the images to recognize an obstacle. Further, the control system 10 recognizes a user based on frame data of images from the camera 17, maintains the distance to the user at a predetermined value, and follows the movement of the user. Further, the control system 10 recognizes a gesture of the user based on frame data of images from the camera 17 and responds to an intention of the user obtained from the recognized gesture. Further, the control system 10 analyzes a voice signal obtained from the microphone 1F and responds to an intention of the user obtained from voice recognition. The control system 10 may transmit frame data of images from the camera 17 and voice data obtained from the microphone IF to the center server 500 on the network from the communication unit 15. In this way, the center server 500 may take partial charge of analysis of the frame data of images and the voice data.

Further, the control system 10 displays images, characters, and other information on the displays 16. Further, the control system 10 detects an operation on the touch panel-attached display 16A to receive a command from the user. The control system 10 responds to a command from the user via the touch panel-attached display 16A, the camera 17, or the microphone IF, by the use of the display 16, the touch panel-attached display 16A, or the loudspeaker 1G.

For example, key information input from the locking-unlocking device 150 is input to the CPU 11, and the CPU 11 collates the input key information with key information registered in advance in the memory 12 to perform authentication. When the authentication result is successful, an unlocking or locking command is transmitted from the CPU 11 to the locking-unlocking device 150. The locking-unlocking device 150 unlocks or locks the door DR1 according to the command from the CPU 11.

The authentication process by the key information of the vehicle 100 may be performed by the locking-unlocking device 150 itself. Alternatively, the authentication process by the key information of the vehicle 100 may be performed by the center server 500. In this case, for example, the key information input from the locking-unlocking device 150 is transmitted to the center server 500 via the communication unit 15, and the authentication result is received from the center server 500. The locking-unlocking device 150 and an input device for key information may be different devices.

The interface IF1 is shown by way of example in FIG. 4, but exchange of signals between the control system 10 and the control objects is not limited to the interface IF1. That is, the control system 10 may have a plurality of signal exchange paths other than the interface IF1. In FIG. 4, the control system 10 includes the single CPU 11. However, this configuration is not limited to a single-processor configuration and may be a multi-processor configuration. Further, a single CPU connected via a single socket may have a multi-core configuration. At least part of the processing of the above-described respective portions may be performed by a processor other than a CPU, for example, a dedicated processor such as a digital signal processor (DSP) or a graphics processing unit (GPU). At least part of the processing of the above-described respective portions may be an integrated circuit (1C) or another digital circuit. An analog circuit may be included in at least part of the above-described respective portions.

Figure 5:
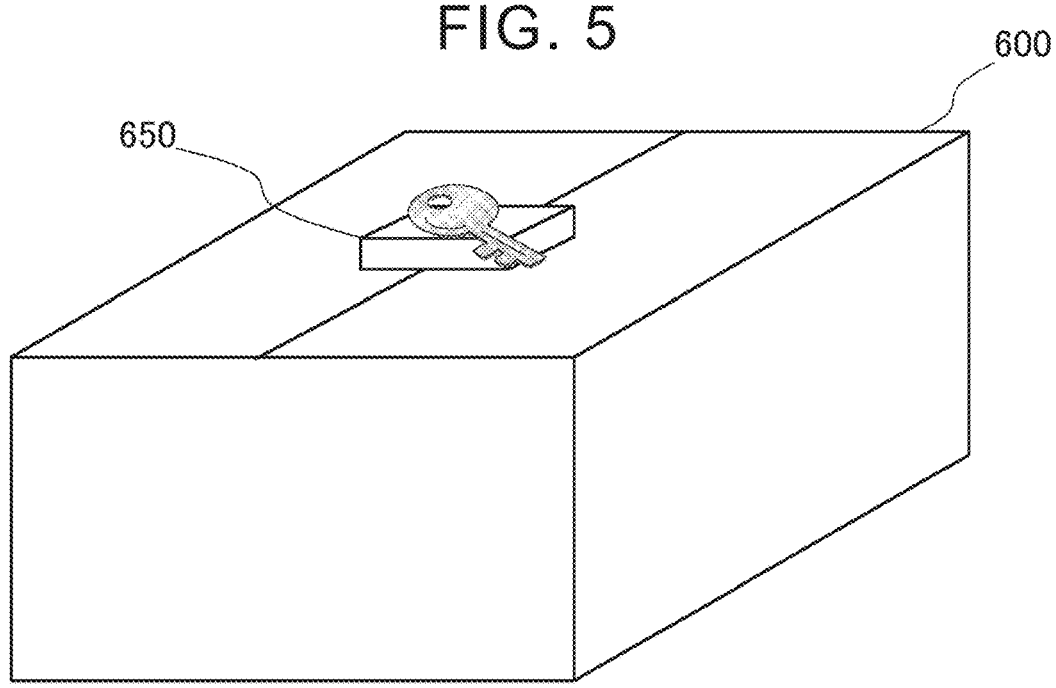
FIG. 5 is a diagram showing one example of the external appearance of a package accommodation case.

FIG. 5 is a diagram showing one example of the external appearance of a package accommodation case 600. The accommodation case 600 is, for example, a cardboard box, a plastic box, or a Styrofoam box. The open mouth of the accommodation case 600 is provided with a locking-unlocking device 650 so that the accommodation case 600 can be locked and unlocked.

The locking-unlocking device 650 includes, for example, an input device, a memory, and a processor. The input device is, for example, a numeric keypad. The processor of the locking-unlocking device 650 unlocks the accommodation case 600 when key information input from the input device and key information stored in the memory coincide with each other. The key information is, for example, a personal identification number or a password. In the first embodiment, the key information of the locking-unlocking device 650 is set in advance and registered in the center server 500. In the first embodiment, the key information of the locking-unlocking device 650 is used when unlocking the locking-unlocking device 650, and the locking-unlocking device 650 can be locked without using the key information.

On the other hand, the configuration is not limited thereto and may be such that the key information of the locking-unlocking device 650 is used for both locking and unlocking of the locking-unlocking device 650. Further, for example, the key information of the locking-unlocking device 650 may be set by a person who performs locking, and stored in the memory of the locking-unlocking device 650. The person who sets the key information of the locking-unlocking device 650 is, for example, a providing user. It may be configured that the person who sets the key information of the locking-unlocking device 650 notifies the set key information of the locking-unlocking device 650 from a user terminal to the center server 500.

The center server 500 stores therein the key information of the locking-unlocking device 650, and the key information of the locking-unlocking device 650 is transmitted from the center server 500 to a receiver. The receiver can unlock the locking-unlocking device 650 of the accommodation case 600 using the key information received from the center server 500.

In the first embodiment, the configuration of the locking-unlocking device 650 provided to the accommodation case 600 is assumed to be very simple. However, the configuration of the locking-unlocking device 650 is not limited thereto. For example, the locking-unlocking device 650 may include a communication unit, and the locking-unlocking device 650 itself may communicate with the center server 500, a user terminal. 200 of a request user, and a user terminal 300. In this case, the locking-unlocking device 650 may transmit key information set in the locking-unlocking device 650 to the center server 500 to register it in the center server 500, and the center server 500 may perform collation (authentication process) between key information input from the input device and the registered key information.

The input device provided to the locking-unlocking device 650 is not limited to the numeric keypad, and an input device compatible with an authentication method employed in the locking-unlocking device 650 may be employed. For example, when a method using a QR code (registered trademark) is employed as an authentication method, a camera is employed as an input device. For example, when vein authentication or fingerprint authentication is employed as an authentication method, an infrared camera or a fingerprint sensor is employed as an input device. For example, when short-range communication is employed as a password entry method, a communication unit corresponding to the short-range communication is employed as an input device.

Figure 6:
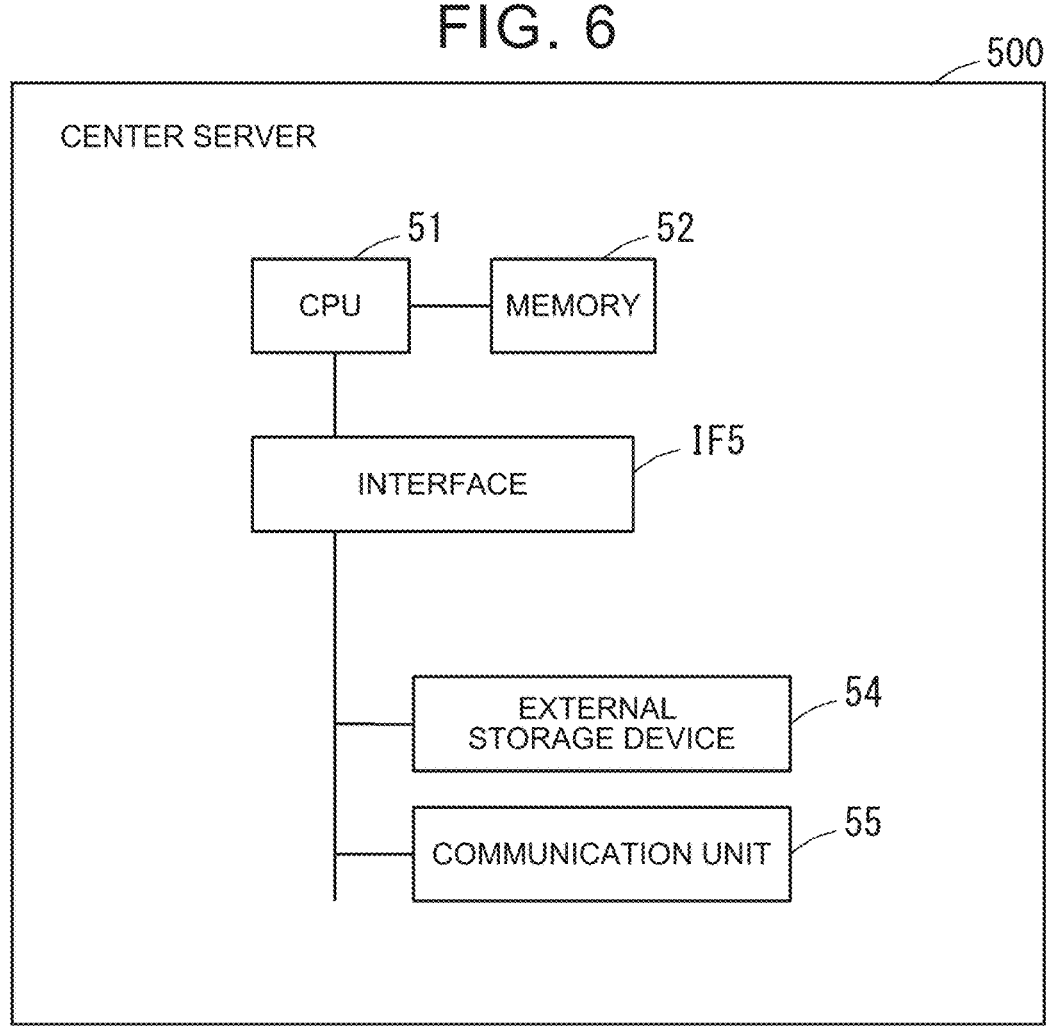
FIG. 6 is a diagram showing one example of the hardware configuration of a center server.

FIG. 6 is a diagram showing one example of the hardware configuration of the center server 500. The center server 500 includes a CPU 51, a memory 52, an interface IF5, an external storage device 54, and a communication unit 55. The configurations and operations of the CPU 51, the memory 52, the interface IF5, and the external storage device 54 are the same as those of the CPU 11, the memory 12, the interface IF1, and the external storage device 14 shown in FIG. 4. For example, the communication unit 55 is connected to a public communication network via LAN and communicates with various servers and so forth on a network via the public communication network.

Like the center server 500, the collection-delivery management server 400 also includes a CPU, a memory, an interface, an external storage device, and a communication unit. The configurations and operations thereof are the same as those of the CPU 51, the memory 52, the interface IF5, the external storage device 54, and the communication unit 55 of the center server 500. Therefore, illustration of the hardware configuration of the collection-delivery management server 400 is omitted.

Figure 7:
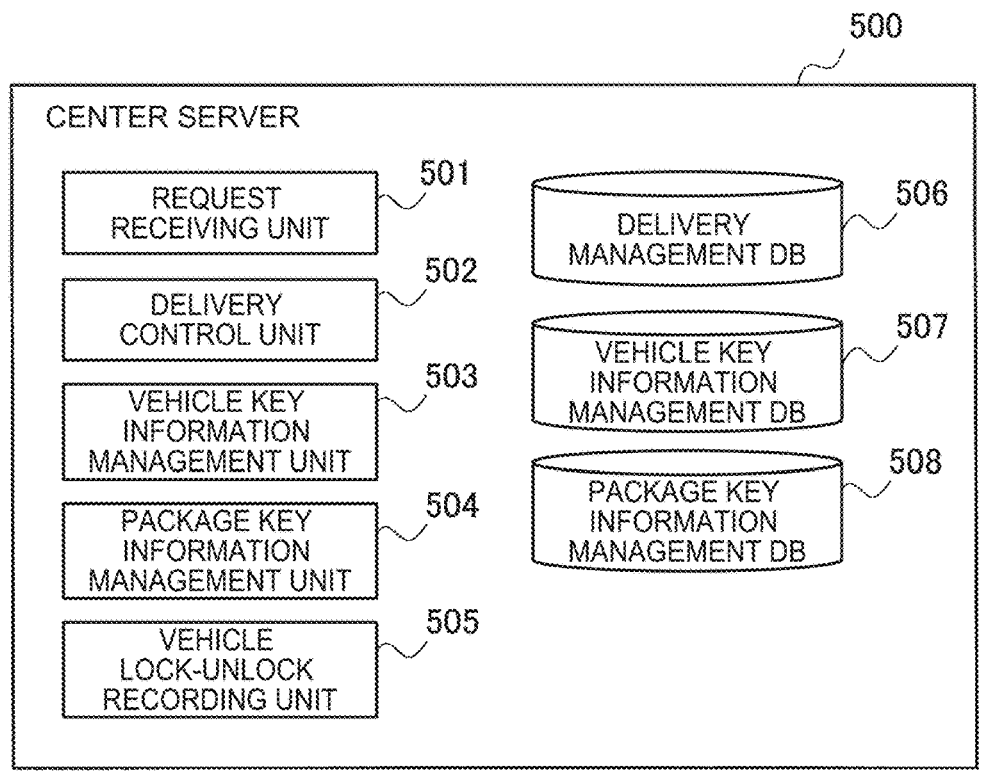
FIG. 7 is a diagram showing one example of the functional configurations of the center server and the vehicle in the delivery system.
Figure 7:
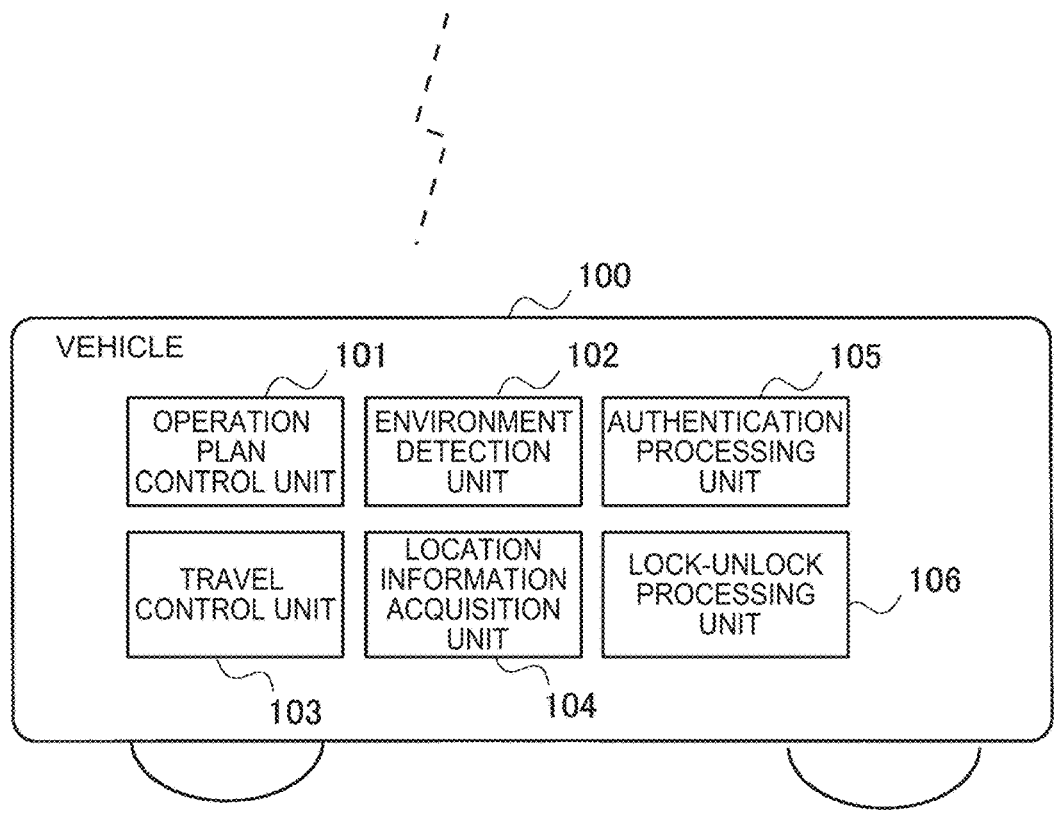

FIG. 7 is a diagram showing one example of the functional configurations of the center server 500 and the vehicle 100 in the delivery system 1. The center server 500 operates as respective units shown in FIG. 7 by executing a computer program stored in the memory 52. That is, the center server 500 includes, as functional components, a request receiving unit 501, a delivery control unit 502, a vehicle key information management unit 503, a package key information management unit 504, a vehicle lock-unlock recording unit 505, a delivery management database (DB) 506, a vehicle key information management DB 507, and a package key information management DB 508.

The request receiving unit 501 receives a request for a delivery service using the vehicle 100, for example, from the collection-delivery management server 400. The request for the delivery service using the vehicle 100 is not exclusively received from the collection-delivery management server 400, but may be received, for example, from a user terminal of an individual user. Along with the request for the delivery service, location information of a delivery destination and a collection place, information about a request user, and information about a receiver are received as delivery information.

When the request for the delivery service using the vehicle 100 is received by the request receiving unit 501, the delivery control unit 502 determines the delivery vehicle that performs this delivery service. A delivery vehicle determination method is not limited to a predetermined method. For example, the delivery control unit 502 receives location information from the respective vehicles 100 every predetermined period and thus grasps the locations of the respective vehicles 100. For example, based on the location information of the respective vehicles 100, the delivery vehicle may be selected from among the vehicles 100 that are off delivery service, or from among the vehicles 100 that are moving toward the collection place.

When the delivery control unit 502 has determined the delivery vehicle, the delivery control unit 502 transmits an operation command to the vehicle 100 selected as the delivery vehicle. The operation command includes, for example, a command to move to the collection place, a command to load a package at the collection place, a command to move from the collection place to the delivery destination, and a command to transfer the package at the delivery destination. Along with the operation command, the delivery information (location information of the delivery destination and the collection place, information about the request user, information about the receiver, etc.) is also transmitted to the vehicle 100 selected as the delivery vehicle. Hereinafter, the vehicle 100 selected as the delivery vehicle will also be referred to simply as the vehicle 100, and it is assumed that after the start of package delivery, when the vehicle is referred to as the vehicle 100, it represents the vehicle 100 selected as the delivery vehicle.

Further, the delivery control unit 502 receives notifications indicative of a delivery status from the vehicle 100, a user terminal 300 of a providing user, and a user terminal of a receiver, and based on the content of the notifications indicative of the delivery status, the delivery control unit 502 controls the vehicle key information management unit 503, the package key information management unit 504, and the vehicle lock-unlock recording unit 505. Details of the processing of the delivery control unit 502 will be described later.

The vehicle key information management unit 503 manages key information of the locking-unlocking device 150 of the vehicle 100. Hereinafter, key information of the locking-unlocking device 150 of the vehicle 100 will be referred to as vehicle key information. The vehicle key information is, for example, a password, a two-dimensional code such as a QR code (registered trademark), a one-dimensional code such as a barcode, or biometric information. The vehicle key information management unit 503 is activated, for example, by the delivery control unit 502. For example, based on the notifications indicative of the delivery status from the vehicle 100, the user terminal 300' of the providing user, and the user terminal of the receiver, the vehicle key information management unit 503 performs distribution and recovery (invalidation process) of vehicle key information and so on with respect to the vehicle 100, the user terminal 300 of the providing user, and the user terminal of the receiver. The vehicle key information is one example of "key information". When the vehicle key information is one example of "key information", the vehicle key information management unit 503 is one example of "a receiving unit" and "a control unit".

The package key information management unit 504 manages key information of the locking-unlocking device 650 of the package accommodation case 600. Hereinafter, key information of the locking-unlocking device 650 of the package accommodation case 600 will be referred to as package key information. The package key information is, for example, a personal identification number or a password. The package key information management unit 504 is activated, for example, by the delivery control unit 502. For example, based on the notifications indicative of the delivery status from the vehicle 100, the user terminal 300 of the providing user, and the user terminal of the receiver, the package key information management unit 504 performs distribution and an invalidation process of package key information and so on with respect to the user terminal of the receiver. Details of the processing of the package key information management unit 504 will be described later. The package key information is one example of "key information". When the package key information is one example of "key information", the package key information management unit 504 is one example of "a receiving unit" and "a control unit".

The vehicle lock-unlock recording unit 505 records a log of locking-unlocking by the locking-unlocking device 150 of the vehicle 100. The vehicle lock-unlock recording unit 505 is activated, for example, by the delivery control unit 502. The vehicle lock-unlock recording unit 505 receives, from the vehicle 100, a locking notification or an unlocking notification, i.e. a notification of locking or unlocking of the vehicle 100 by the locking-unlocking device 150. Along with the locking notification or the unlocking notification, for example, identification information of the vehicle 100, vehicle key information used for locking or unlocking, a timestamp, and location information of the vehicle 100 are also received. When a user who locked or unlocked the vehicle 100 is a user other than a receiver, the vehicle lock-unlock recording unit 505 records a log of locking or unlocking of the vehicle 100. Details of the processing of the vehicle lock-unlock recording unit 505 will be described later.

The delivery management DB 506, the vehicle key information management DB 507, and the package key information management DB 508 are produced, for example, in the external storage device 54 of the center server 500'. The delivery management DB 506 stores therein, for example, a delivery management information table holding information relating to a delivery service using the vehicle 100, for which a request is received by the request receiving unit 501, and a collection place management information table holding information about a collection place. Details of the delivery management information table and the collection place management information table will be described later.

The vehicle key information management DB 507 stores therein, for example, a vehicle key information management table holding management information about vehicle key information of the vehicle 100, and a vehicle lock-unlock recording table holding a log of locking-unlocking of the vehicle 100. Details of the vehicle key information management table and the vehicle lock-unlock recording table will be described later. The package key information management DB 508 stores therein, for example, a package key information management table holding management information about package key information of a delivery package. Details of the package key information management table will be described later. When the vehicle key information is one example of "key information", the vehicle key information management DB 507 is one example of "a storage unit". When the package key information is one example of "key information", the package key information management DB 508 is one example of "a storage unit".

Any of the functional components of the center server 500 or part of the processing thereof may be performed by another computer connected to the network. A series of processes that are performed by the center server 500 can be performed by hardware and can alternatively be performed by software.

The vehicle 100 operates as respective units shown in FIG. 7 by the execution of a computer program stored in the memory. The vehicle 100 includes, as functional components, for example, an operation plan control unit 101, an environment detection unit 102, a travel control unit 103, a location information acquisition unit 104, an authentication processing unit 105, and a lock-unlock processing unit 106. The operation plan control unit 101, the environment detection unit 102, the travel control unit 103, the location information acquisition unit 104, the authentication processing unit 105, and the lock-unlock processing unit 106 are the functional components that are realized by the execution of the program stored in the memory 12 by the CPU 11. The lock-unlock processing unit 106 is the functional component corresponding to the locking-unlocking device 150.

For example, the location information acquisition unit 104 acquires, every predetermined period, location information of the vehicle 100 acquired by the GPS receiving unit 1E and so on and transmits it to the center server 500. The location information of the vehicle 100 is, for example, latitude and longitude. Alternatively, the location information of the vehicle 100 may be, for example, an address. The location information of the vehicle 100 acquired by the location information acquisition unit 104 is also output, for example, to the operation plan control unit 101 and the travel control unit 103.

The operation plan control unit 101 receives an operation command from the center server 500. Based on the operation command and the location information of the subject vehicle acquired by the location information acquisition unit 104, the operation plan control unit 101 calculates a route to be travelled by the vehicle 100 and produces an operation plan. The operation plan includes data about the calculated route to be travelled by the vehicle 100 and data that specifies processing to be performed by the vehicle 100 in part or the whole of the route. For example, the following data (1) and (2) are given as examples of data to be included in the operation plan.

(1) Data expressing a route to be travelled by the subject vehicle using an aggregate of road links: For example, by referring to stored map data, the route to be travelled by the subject vehicle may be automatically produced based on given start point, stopover point, and destination point. Calculation of the route to be travelled by the subject vehicle is not necessarily performed in the vehicle 100 and may rely on the processing of an external device (e.g. the center server 500). In this case, the center server 500 acquires a subject-vehicle location from the vehicle 100, calculates a route to be travelled by the vehicle 100, and includes the calculated route data in the above-described operation command.

(2) Data expressing processes to be performed by the subject vehicle at points on the route: The processes to be performed by the subject vehicle include, for example, "allowing a user to get on and off" and "loading a package", but not limited thereto. The operation plan produced by the operation plan control unit 101 is transmitted to the later-described travel control unit 103.

Based on data acquired by various sensors installed in the vehicle 100, the environment detection unit 102 detects environmental information around the vehicle 100 that is used for autonomous driving. Detection objects of the environment detection unit 102 include, for example, information such as the number and location of lanes, the number and location of vehicles present around the subject vehicle, the number and location of obstacles (e.g. pedestrians, bicycles, structures, buildings) present around the subject vehicle, road structures, and road signs, but not limited thereto. Any objects may be included in the detection objects as long as those are used for performing autonomous driving. For example, when a sensor is a stereo camera, object detection around the vehicle 100 is performed by processing image data captured by the stereo camera. The environment detection unit 102 not only simply detects an object around the vehicle 100, but also may perform tracking of the detected object. Tracking is, for example, to continue detection of the detected object. For example, based on a difference between coordinates of an object detected at the last step and current coordinates of the object, the relative speed of the object can be calculated. The data about surrounding environment of the vehicle 100 detected by the environment detection unit 102 is output to the later-described travel control unit 103.

For example, based on the operation plan produced by the operation plan control unit 101, the data about surrounding environment of the vehicle 100 produced by the environment detection unit 102, and the location information of the subject vehicle acquired by the location information acquisition unit 104, the travel control unit 103 produces a control command for controlling autonomous driving of the subject vehicle. For example, when a travel start command is input from the operation plan control unit 101, the travel control unit 103 produces a control command for causing the subject vehicle to travel along the predetermined route and travel in such a way that no obstacle enters a predetermined safe area centering around the subject vehicle. The produced control command is transmitted to the drive motor 1C. A known method can be employed as a method for producing a control command for autonomous driving of the vehicle.

The authentication processing unit 105 collates vehicle key information input to the locking-unlocking device 150 with vehicle key information stored in the external storage device 14. When the vehicle key information input to the locking-unlocking device 150 coincides with the vehicle key information stored in the external storage device 14, the authentication processing unit 105 determines that the authentication has succeeded, and outputs a locking or unlocking command to the lock-unlock processing unit 106. When the vehicle key information input to the locking-unlocking device 150 does not coincide with the vehicle key information stored in the external storage device 14, the authentication processing unit 105 determines that the authentication has failed.

In response to receipt of the locking or unlocking command from the authentication processing unit 105, the lock-unlock processing unit 106, for example, locks or unlocks the door DR1. For example, when the lock-unlock processing unit 106 locked or unlocked the door DR1, the lock-unlock processing unit 106 outputs vehicle key information used for locking or unlocking, a timestamp, and location information of the vehicle 100 to the operation plan control unit 101. The operation plan control unit 101 produces a locking notification or an unlocking notification including identification information of the vehicle 100, the vehicle key information, the timestamp, and the location information and transmits it to the center server 500.

Identification information of a user who performs locking or unlocking of the vehicle 100 may be input to the locking-unlocking device 150 along with the vehicle key information. In this case, the identification information of the user may also be included in the locking notification or the unlocking notification.

FIG. 8 shows one example of the delivery management information table. The delivery management information table is stored in the delivery management DB 506 of the center server 500. In the delivery management information table, information relating to a delivery service using the vehicle 100 is stored. More specifically, the delivery management information table includes fields of delivery ID, delivery vehicle ID, request user ID, collection place code, delivery destination information, receiver information, and delivery status.

For example, an entry of the delivery management information table is produced by the request receiving unit 501 when the request receiving unit 501 has received a request for a delivery service. Identification information of the delivery service is input into the delivery ID field. Identification information given by the collection-delivery management server 400 or identification information given by the request receiving unit 501 of the center server 500 may be input into the delivery ID field.

Identification information of the vehicle 100 selected as the delivery vehicle in the subject delivery service is input into the delivery vehicle ID field. For example, the value of the delivery vehicle ID field is input by the delivery control unit 502 when the delivery vehicle is determined.

Identification information of a request user is input into the request user ID field. A code indicative of a collection place is input into the collection place code field. Location information or the like of a delivery destination is input into the delivery destination information field. Information indicating whether or not a receiver is the same as the request user is input into the receiver information field, and when the receiver is different from the request user, a name or the like of the receiver is input into the receiver information field. For example, the values of the fields of request user ID, collection place code, delivery destination information, and receiver information are included in the delivery request from the collection-delivery management server 400 and input by the request receiving unit 501 of the center server 500.

A value indicative of a status of the delivery service is input into the delivery status field. The values to be stored in the delivery status field represent, for example, "before dispatch", "during delivery", and "delivery completed". For example, "before dispatch" represents a status in which the vehicle 100 is moving toward a collection place and no package is loaded in the vehicle 100. For example, "during delivery" represents a status in which the vehicle 100 loads a package at the collection place and is moving from the collection place toward a delivery destination. For example, "delivery completed" represents a status in which the vehicle 100 has arrived at the delivery destination and transfer of the package to a receiver has completed. The delivery status field is managed, for example, by the delivery control unit 502.

FIG. 9 shows one example of the collection place management information table. For example, the collection place management information table is stored in advance in the delivery management DB 506 of the center server 500. For example, information about stores or the like under contract to provide products to the delivery system 1 is stored in the collection place management information table. More specifically, the collection place management information table includes fields of collection place code, store name, address, contact information, and providing user ID.

A code indicative of a collection place is input into the collection place code field. A store name or the like representing the collection place is input into the store name field. An address of the collection place is input into the address field. For example, an e-mail address or the like for contact is input into the contact information field. Identification information of a providing user at the collection place is input into the providing user ID field. Identification information of a providing user may be shared by a plurality of providing users, or different pieces of identification information may be given to providing users one by one.

FIG. 10 shows one example of the vehicle key information management table. The vehicle key information management table is stored in the vehicle key information management DB 507 of the center server 500. Information about vehicle key information is stored in the vehicle key information management table. More specifically, the vehicle key information management table includes, for example, fields of vehicle ID, delivery ID, user ID, and key information.

Identification information of the vehicle 100 is input into the vehicle ID field. Identification information of a delivery service is input into the delivery ID field. Identification information of a providing user, a request user, or a receiver, to whom vehicle key information is issued, is input into the user ID field. Vehicle key information issued to a user, whose identification information is input into the corresponding user ID field, is input into the key information.

The vehicle key information management table is managed, for example, by the vehicle key information management unit 503. The example shown in FIG. 10 is an example of the vehicle key information management table when different pieces of vehicle key information are respectively assigned to users. In the first embodiment, a plurality of pieces of vehicle key information are pooled in advance for the respective vehicles 100 and are dispensed as needed. In the first embodiment, the pieces of vehicle key information pooled for the respective vehicles 100 are stored in advance in the external storage device 54 of the center server 500 and the external storage devices 14 of the vehicles 100, but not limited thereto. Vehicle key information may be newly produced per user by the center server 500 upon every occurrence of a delivery service, and deleted when the delivery service has ended. In this case, for example, the vehicle key information is transmitted also to the vehicle 100 along with an operation command.

FIG. 11 shows one example of the vehicle lock-unlock recording table. The vehicle lock-unlock recording table is stored, for example, in the vehicle key information management DB 507 of the center server 500. The vehicle lock-unlock recording table is log information of locking-unlocking of the vehicle 100. More specifically, the vehicle lock-unlock recording table includes fields of vehicle ID, lock-unlock, timestamp, user ID, location information, and key information.

Identification information of the vehicle 100 is input into the vehicle ID field. Either one of "lock" and "unlock" is input into the lock-unlock field. Date and time when locking-unlocking was performed is input into the timestamp field. Identification information of a user who locked-unlocked the vehicle 100 is input into the user ID field.

Location information of the vehicle 100 when locking-unlocking of the vehicle 100 was performed is input into the location information field. Vehicle key information used for locking-unlocking of the vehicle 100 is input into the key information field.

In the first embodiment, one vehicle lock-unlock recording table is produced for one delivery service. Therefore, for example, when the single vehicle 100 is performing a plurality of delivery services, vehicle lock-unlock recording tables are produced for the subject vehicle 100 as many as the number of the delivery services. In this case, each occurrence of locking-unlocking of the subject vehicle 100 is recorded in the vehicle lock-unlock recording tables as many as the number of the delivery services that are being performed by the subject vehicle 100.

In the first embodiment, locking-unlocking of the vehicle 100 by a receiver is not recorded in the vehicle lock-unlock recording table. In the first embodiment, when delivery completion is notified, the vehicle lock-unlock recording table for the corresponding delivery service is deleted. However, the vehicle lock-unlock recording table shown in FIG. 11 and the processing about the vehicle lock-unlock recording table are only one example, and changes may be made as appropriate according to a specific embodiment.

The vehicle lock-unlock recording table is managed, for example, by the vehicle lock-unlock recording unit 505 of the center server 500. For example, the values of the fields of vehicle ID, lock-unlock, timestamp, location information, and key information are included in a locking notification or an unlocking, notification from the vehicle 100 and acquired from the locking notification or the unlocking notification. For example, the value of the user ID field is acquired from the value of the user ID field associated with the key information included in the locking notification or the unlocking notification in the vehicle key information management table, but not limited thereto. For example, when vehicle key information of the vehicle 100 is shared by a plurality of users, identification information of the user is input to the locking-unlocking device 150 of the vehicle 100 along with the vehicle key information so that the identification information of the user is also included in the locking notification or the unlocking notification, and therefore, the value of the user ID field in the vehicle lock-unlock recording table is also acquired from the locking notification or the unlocking notification.

FIG. 12 shows one example of the package key information management table. The package key information management table is stored in the package key information management DB 508 of the center server 500. Information about package key information is stored in the package key information management table. Specifically, the package key information management table includes fields of package ID, key information, delivery ID, security level, and invalidation timer.

Identification information of the accommodation case 600 is input into the package ID field. Package key information is input into the key information field. ID of a delivery service that delivers the accommodation case 600 of which identification information is stored in the corresponding package ID field is stored in the delivery ID field. Either one of "1" and "2" indicative of security level is input into the security level field. Details of the security level will be described later. A remaining time until the package key information is deleted from the package key information management table is input into the invalidation timer field. For example, when a notification of delivery completion of the corresponding, delivery service is received, the value of an invalidation timer is set in the invalidation timer field. The value of the invalidation timer is set, for example, from a few hours to one week.

The package key information management table is managed, for example, by the package key information management unit 504 of the center server 500. In the first embodiment, the values of the fields of package ID and key information are input in advance. For example, as the value of the delivery ID field, one included in a collection completion notification from the vehicle 100 is input.

FIG. 13 is a diagram showing one example of the definition of the security level of package key information. In the first embodiment, two levels, i.e. the level 1 and the level 2, are defined as the security levels of package key information. At the security level 1, the management of package key information is performed by the center server 500. At the security level 2, the management of package key information is performed by a receiver.

For example, in the initial status, the security level of package key information is the level 1. When a delivery completion notification is received, the security level of package key information of a package (the accommodation case 600) that is delivered in the subject delivery service is changed to the level 2 so that the management authority shifts from the center server 500 to a receiver.

When the management authority has shifted from the center server 500 to the receiver, the center server 500, for example, performs an invalidation process such as deletion of the corresponding package key information and does not perform processing for the corresponding package key information thereafter.

Flow of Process

Figure 14:
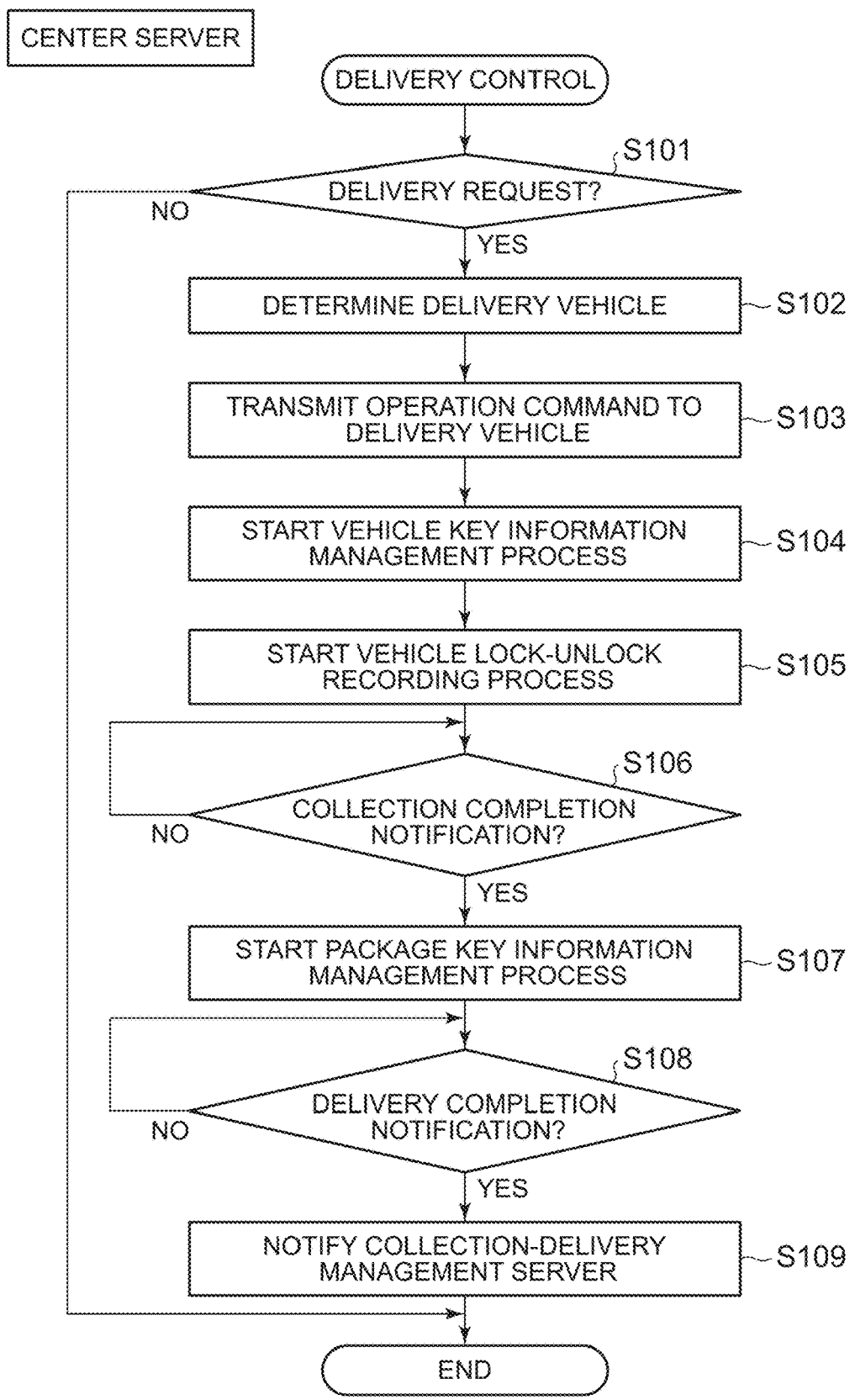
FIG. 14 is a diagram showing one example of a flowchart of a delivery control process performed by a delivery control unit of the center server.

FIG. 14 shows one example of a flowchart of a delivery control process performed by the delivery control unit 502 of the center server 500. For example, the process shown in FIG. 14 is repeatedly performed every predetermined period. A performer of the process shown in FIG. 14 is the CPU 51 that executes the program, but, for convenience, a description will be given assuming that the delivery control unit 502 being the functional component is a performer. Likewise, flowcharts subsequent to FIG. 14 will be described assuming that the functional component is a performer.

At S101, the delivery control unit 502 determines whether or not a delivery request is received. When the delivery request is received (S101: YES), the process proceeds to S102. When the delivery request is not received (S101: NO), the process shown in FIG. 14 ends. When the delivery request is received, for example, an entry of the subject delivery service is produced in the delivery management information table by the request receiving unit 501. Further, "before dispatch" is input into a delivery status field of the produced entry.

At S102, the delivery control unit 502 determines, a delivery vehicle that performs delivery in the delivery service for which the delivery request is received at S101. Hereinafter, when the vehicle is referred to as the vehicle 100 in the flowchart of FIG. 14 and the subsequent flowcharts, it represents the vehicle 100 selected as the delivery vehicle.

At S103, the delivery control unit 502 transmits an operation command to the vehicle 100. At S104, the delivery control unit 502 activates the vehicle key information management unit 503. Hereinafter, a later-described vehicle key information management process will be performed by the vehicle key information management unit 503. At S105, the delivery control unit 502 activates the vehicle lock-unlock recording unit 505. Hereinafter, a later-described vehicle lock-unlock recording process will be performed for the subject delivery service by the vehicle lock-unlock recording unit 505.

At S106, the delivery control unit 502 determines whether or not a collection completion notification is received for the subject delivery service from the vehicle 100. For example, the collection completion notification is input to the vehicle 100 by a providing user at a collection place and transmitted from the vehicle 100 to the center server 500, but not limited thereto. For example, the collection completion notification may be transmitted from a user terminal 300 of the providing user to the center server 500. The collection completion notification includes, for example, identification information of a delivery service, identification information of a providing user, identification information of the accommodation case 600 loaded into the vehicle 100 at a collection place, and so on.

When the collection completion notification is received for the subject delivery service (S106: YES), the process proceeds to S107. Further, when the collection completion notification is received for the subject delivery service, the delivery control unit 502 updates the value of the delivery status field of the entry of the subject delivery service in the delivery management information table from "before dispatch" to "during delivery".

When the collection completion notification is not received for the subject delivery service (S106: NO), the process is in a standby state until the collection completion notification is received. For example, when the collection completion notification is not received even waiting for a predetermined time, the delivery control unit 502 may inquire of the vehicle 100 or the user terminal 300 of the providing user.

At S107, the delivery control unit 502 activates the package key information management unit 504. Hereinafter, a later-described package key information management process will be performed by the package key information management unit 504.

At S108, the delivery control unit 502 determines whether or not a delivery completion notification is received for the subject delivery service from the vehicle 100. For example, the delivery completion notification is input to the vehicle 100 by the providing user at a delivery destination and transmitted from the vehicle 100 to the center server 500, but not limited thereto. At S108, instead of the delivery completion notification from the vehicle 100, a receipt confirmation notification from a user terminal of a receiver may be used. For example, when the receiver has received the package, the receipt confirmation notification is transmitted from a user terminal 200 of the receiver to the center server 500. The delivery completion notification and the receipt confirmation notification each include, for example, identification information of a delivery service, identification information of a receiver, and so on.

When the delivery completion notification is received for the subject delivery service (S108: YES), the process proceeds to S109. Further, when the delivery completion notification is received for the subject delivery service, the delivery control unit 502 updates the value of the delivery status field of the entry of the subject delivery service in the delivery management information table from "during delivery" to "delivery completed".

When the delivery completion notification is not received for the subject delivery service (S108: NO), the process, is in a standby state until the delivery completion notification is received. For example, when the delivery completion notification is not received even waiting for a predetermined time, the delivery control unit 502 may inquire of the vehicle 100 or the user terminal of the receiver.

At S109, the delivery control unit 502 notifies the delivery completion of the subject delivery service to the collection-delivery management server 400. Thereafter, the process shown in FIG. 14 ends.

Figure 15:
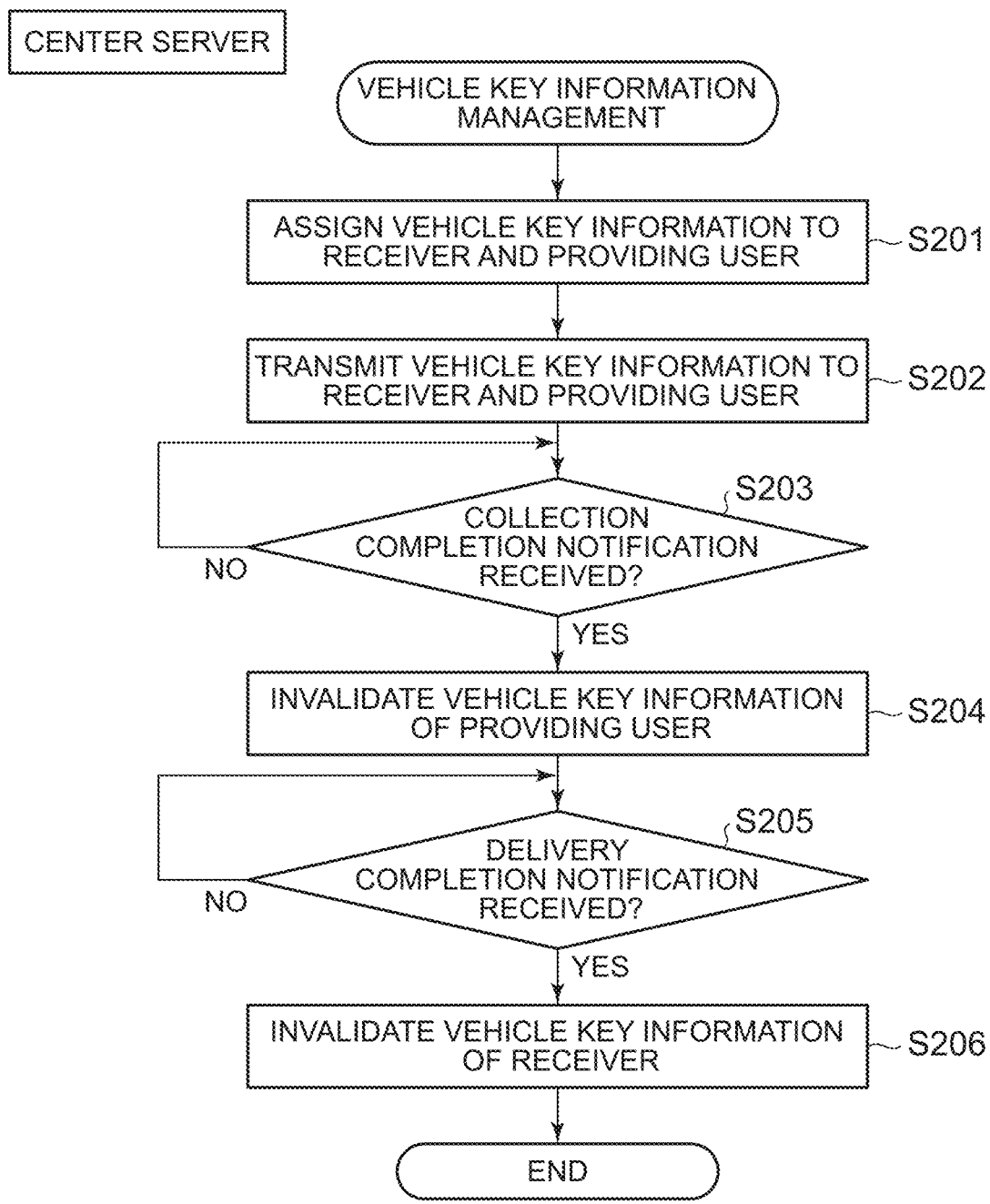
FIG. 15 is a diagram showing one example of a flowchart of a vehicle key information management process performed by a vehicle key information management unit of the center server.

FIG. 15 shows one example of a flowchart of the vehicle key information management process performed by the vehicle key information management unit 503 of the center server 500. For example, the process shown in FIG. 15 is started by activation of the vehicle key information management unit 503 by the delivery control unit 502 at S104 in FIG. 14.

At S201, the vehicle key information management unit 503 assigns vehicle key information of the vehicle 100 to a receiver and a providing user of the subject delivery service. Information about the receiver and the providing user of the subject delivery service is acquired, for example, from the delivery management information table. The vehicle key information management unit 503 produces an entry of the vehicle key information management table for the receiver and the providing user of the subject delivery service.

At S202, the vehicle key information management unit 503 transmits the vehicle key information of the vehicle 100 to user terminals of the receiver and the providing user. At S203, the vehicle key information management unit 503 determines whether or not a collection completion notification is received for the subject delivery service. When the collection completion notification is received for the subject delivery service (S203: YES), the process proceeds to S204. When the collection completion notification is not received for the subject delivery service (S203: NO), the process is in a standby state until the collection completion notification is received.

At S204, the vehicle key information management unit 503 invalidates the vehicle key information assigned to the providing user. For example, the invalidation process of the vehicle key information is to delete the vehicle key information from the memory 12 of the vehicle 100 and from the vehicle key information management table, or to notify the vehicle 100 that the vehicle key information is invalid, and record in the vehicle key information management table that the vehicle key information is invalid. The vehicle key information management unit 503 may command the user terminal 300 of the providing user to delete the vehicle key information or notify the user terminal 300 of the providing user that the vehicle key information is invalidated.

At S205, the vehicle key information management unit 503 determines whether or not a delivery completion notification is received for the subject delivery service. When the delivery completion notification is received for the subject delivery service (S205: YES), the process proceeds to S206. When the delivery completion notification is not received for the subject delivery service (S205: NO), the process is in a standby state until the delivery completion notification is received. At S205, a receipt confirmation notification from the user terminal of the receiver may be used instead of the delivery completion notification.

At S206, the vehicle key information management unit 503 invalidates the vehicle key information assigned to the receiver. Thereafter, the process shown in FIG. 15 ends.

Figure 16:
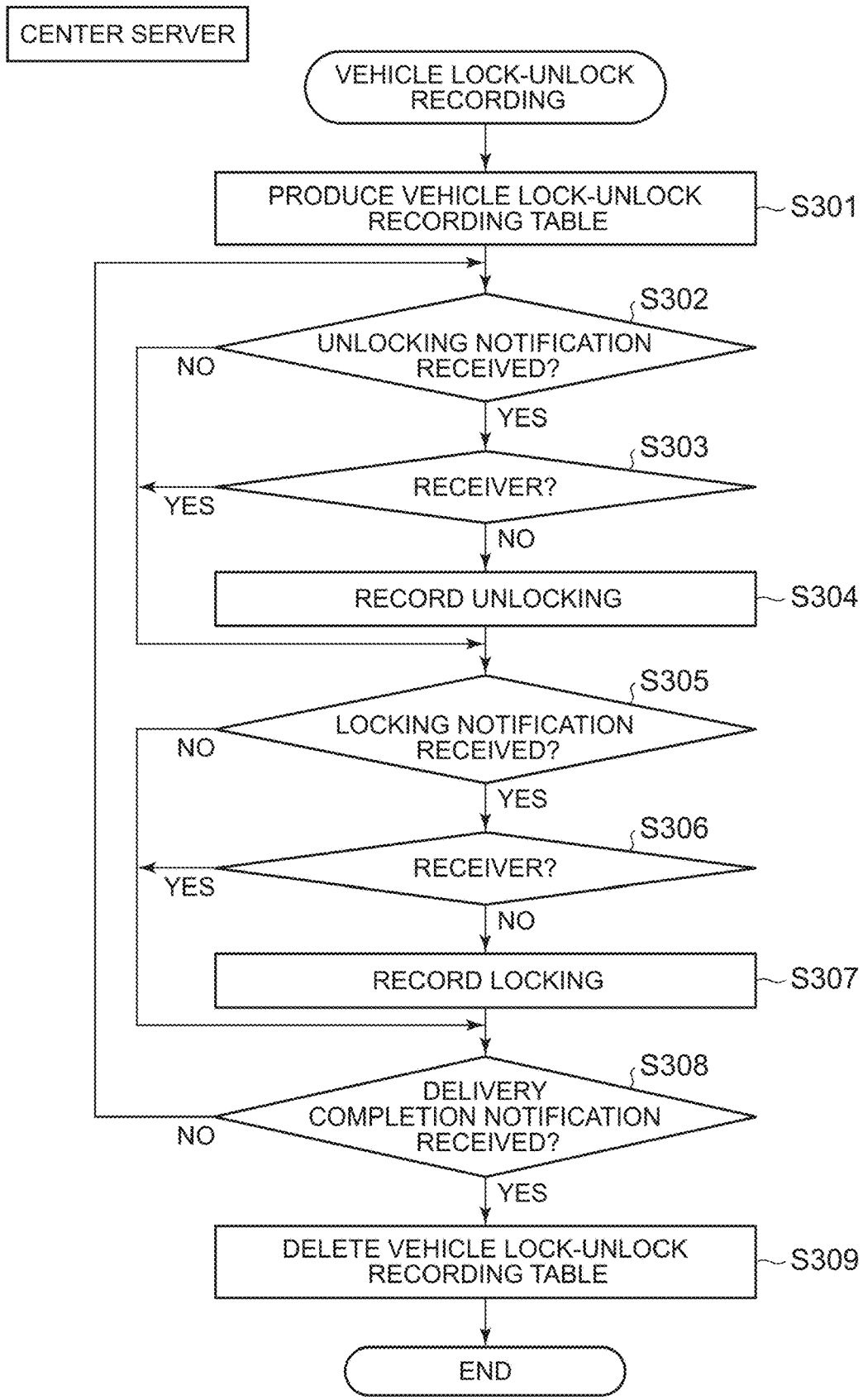
FIG. 16 is a diagram showing one example of a flowchart of a vehicle lock-unlock recording process performed by a vehicle lock-unlock recording unit of the center server.

FIG. 16 shows one example of a flowchart of the vehicle lock-unlock recording process performed by the vehicle lock-unlock recording unit 505 of the center server 500. For example, the process shown in FIG. 16 is started by activation of the vehicle lock-unlock recording unit 505 by the delivery control unit 502 at S105 in FIG. 14.

At S301, the vehicle lock-unlock recording unit 505 produces a vehicle lock-unlock recording table for the subject delivery service.

At S302, the vehicle lock-unlock recording unit 505 determines whether or not an unlocking notification is received. When the unlocking notification is received (S302: YES), the process proceeds to S303. When the unlocking notification is not received (S302: NO), the process proceeds to S305.

At S303, the vehicle lock-unlock recording unit 505 determines whether or not the unlocking notification is from a user terminal of a receiver. It is possible to determine from which user an unlocking notification or a locking notification is transmitted, for example, based on vehicle key information included in the unlocking notification or the locking notification and user identification information associated with the vehicle key information in the vehicle key information management table. Alternatively, when identification information of a user as a transmitter is included in an unlocking notification or a locking notification, a determination can be made based on the user identification information included in the unlocking notification or the locking notification.

When the unlocking notification is from the user terminal of the receiver (S303: YES), the process proceeds to S305. When the unlocking notification is from a user terminal other than the receiver (S303: NO), the process proceeds to S304. At S304, the vehicle lock-unlock recording unit 505 records a log of unlocking in the vehicle lock-unlock recording table.

At S305, the vehicle lock-unlock recording unit 505 determines whether or not a locking notification is received. When the locking notification is received (S305: YES), the process proceeds to S306. When the locking notification is not received (S305: NO), the process proceeds to S308.

At S306, the vehicle lock-unlock recording unit 505 determines whether or not the locking notification is from a user terminal of a receiver. When the locking notification is from the user terminal of the receiver (S306: YES), the process proceeds to S308. When the locking notification is from a user terminal other than the receiver (S306: NO), the process proceeds to S307. At S307, the vehicle lock-unlock recording unit 505 records a log of locking in the vehicle lock-unlock recording table.

At S308, the vehicle lock-unlock recording unit 505 determines whether or not a delivery completion notification is received for the subject delivery service. When the delivery completion notification is not received (S308: NO), the process proceeds to S302. When the delivery completion notification is received (S308: YES), the process proceeds to S309. At S308, a receipt confirmation notification from the user terminal of the receiver may be used instead of the delivery completion notification.

At S309, the vehicle lock-unlock recording unit 505 deletes the vehicle lock-unlock recording table produced at S301. Thereafter, the process shown in FIG. 16 ends.

The vehicle lock-unlock recording process shown in FIG. 16 is only one example, and not limited thereto. For example, the execution order of the steps from S302 to S304 and the steps from S305 to S307 may be reversed. When the delivery completion notification is received, the vehicle lock-unlock recording table for the subject delivery service is deleted. However, for example, deletion of the vehicle lock-unlock recording table may be postponed until a predetermined time has elapsed from receipt of the delivery completion notification.

By recording logs of locking-unlocking of the vehicle 100, when, for example, a package is lost during delivery, the time and location where the package is lost can be specified from the logs of locking-unlocking of the vehicle 100. On the other hand, when the delivery completion notification is received, the vehicle lock-unlock recording table for the subject delivery service is deleted. Consequently, it is possible to shorten the time period of managing the logs of locking-unlocking of the vehicle 100 being a piece of security information for the delivery service so that the load of the center server 500 for storing the security information can be reduced.

Figure 17:
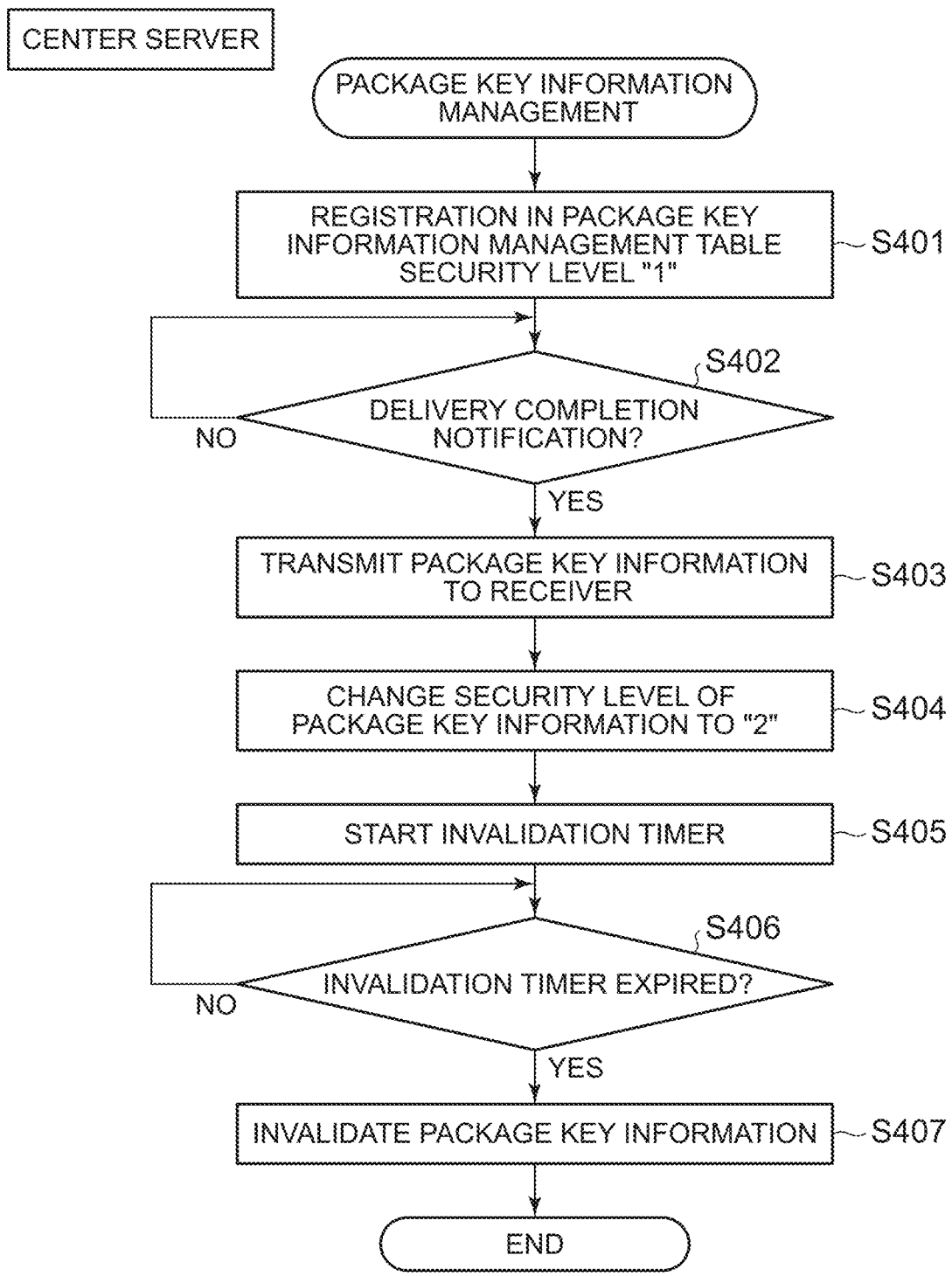
FIG. 17 is a diagram showing one example of a flowchart of a package key information management process performed by a package key information management unit of the center server.

FIG. 17 shows one example of a flowchart of the package key information management process performed by the package key information management unit 504 of the center server 500. For example, the process shown in FIG. 17 is started by activation of the package key information management unit 504 by the delivery control unit 502 at S107 in FIG. 14.

At S401, the package key information management unit 504 registers identification information of the subject delivery service in a delivery ID field of an entry, corresponding to identification information of a package (the accommodation case 600) included in the collection completion notification received at S106 in FIG. 14, in the package key information management table. Further, the package key information management unit 504 inputs "1" into a security level field of the entry of the package key information management table.

At S402, the package key information management unit 504 determines whether or not a delivery completion notification is received for the subject delivery service. When the delivery completion notification is not received (S402: NO), the process is in a standby state. When the delivery completion notification is received (S402: YES), the process proceeds to S403. At S402, a receipt confirmation notification from the user terminal of the receiver may be used instead of the delivery completion notification.

At S403, the package key information management unit 504 transmits package key information associated with identification information of a delivery service, included in the delivery completion notification, in the package key information management table to the user terminal of the receiver. At S404, the package key information management unit 504 changes the value of a security level field of an entry, corresponding to the identification information of the delivery service included in the delivery completion notification, in the package key information management table to "2". At S405, the package key information management unit 504 sets the value of an invalidation timer field of the entry in the package key information management table to a value of an invalidation timer.

At S406, the package key information management unit 504 determines whether or not the invalidation timer has expired. When the invalidation timer has not expired (S406: NO), the package key information management unit 504 waits until the invalidation timer has expired. When the invalidation timer has expired (S406: YES), the process proceeds to S407.

At S407, the package key information management unit 504 deletes the entry, corresponding to the identification information of the delivery service included in the delivery completion notification, in the package key information management table. Thereafter, the process shown in FIG. 17 ends.

Specific Example

Figure 18A:
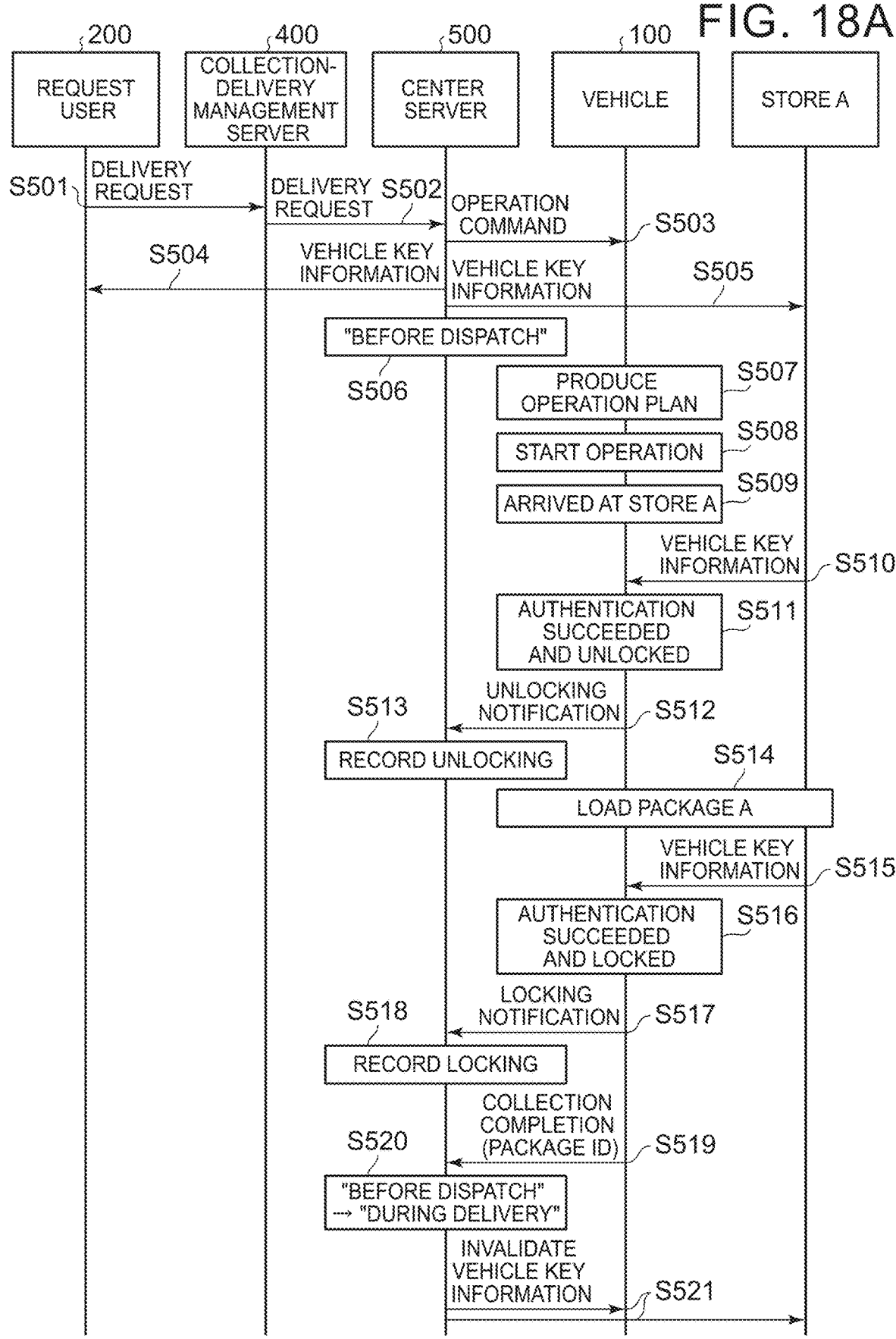
FIG. 18A is a diagram showing one example of the processing sequence in a specific example.
Figure 18B:
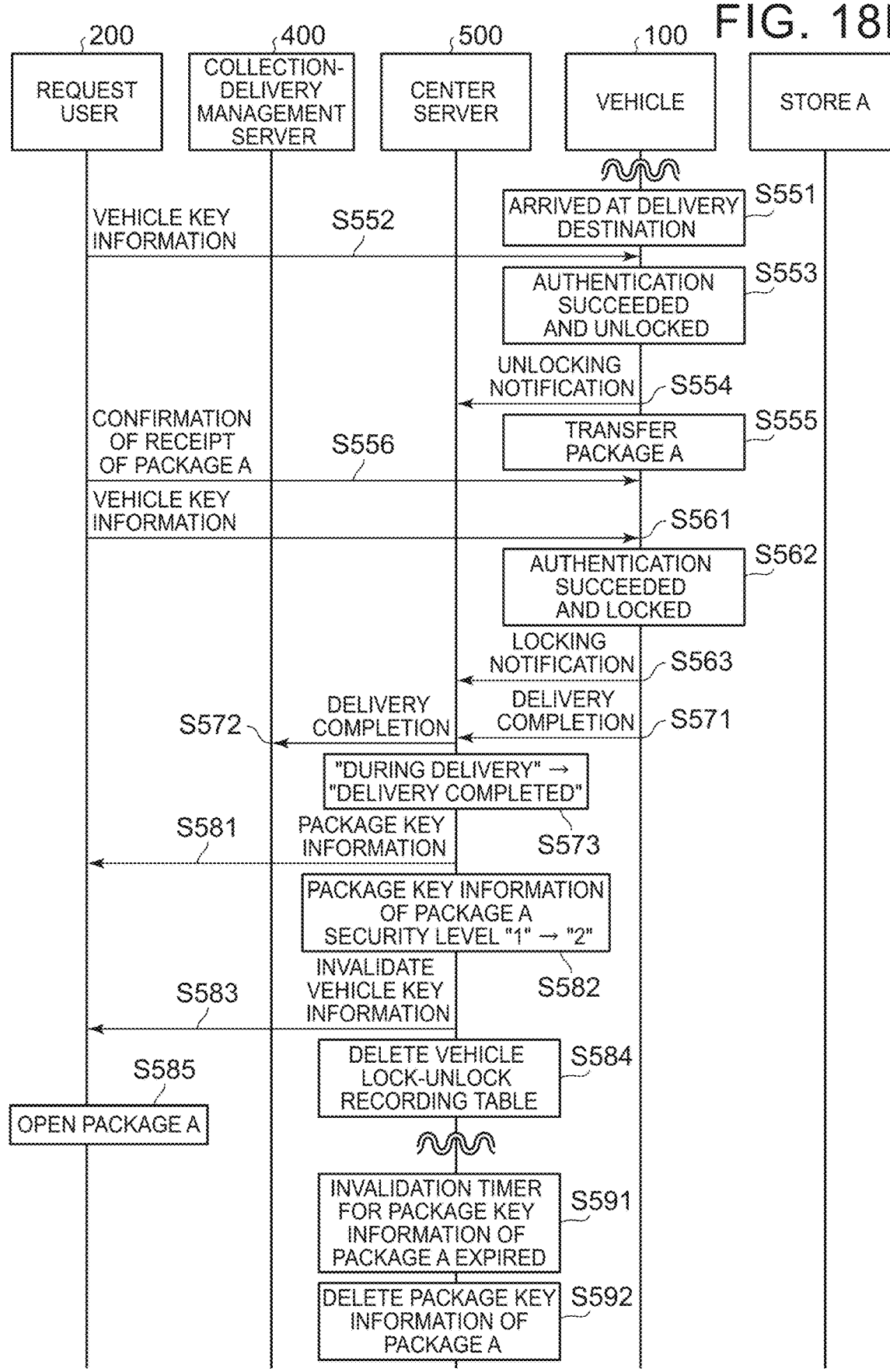
FIG. 18B is a diagram showing one example of the processing sequence in the specific example.

FIGS. 18A and 18B are diagrams showing one example of the processing sequence in a specific example. In the specific example, a description will be given of a case where, according to a request for a delivery service using the vehicle 100, the vehicle 100 loads a package at a store A and delivers the package to a delivery destination. In FIGS. 18A and 18B, for convenience, a request user and a user terminal 200 of the request user, and a providing user of the store A and a user terminal 300 of the providing user are collectively indicated as "request user" and "store A", respectively.

At S501, through the user terminal 200, the request user purchased a product A sold at the store A and transmits a request for delivery to the request user's home to the collection-delivery management server 400. The content of the delivery request includes that a delivery package is the product A of the store A and that a delivery destination is the request user's home.

At S502, in response to receipt of the delivery request from the request user, the collection-delivery management server 400 determines to use a delivery service using the vehicle 100 for the subject delivery and transmits a request for the delivery service using the vehicle 100 to the center server 500. The request for the delivery service includes identification information of the request user, a collection place code of the store A, an address of the request user's home as delivery destination information, and so on.

At S503, in response to receipt of the request for the delivery service using the vehicle 100 from the collection-delivery management server 400 (FIG. 14, S101: YES), the center server 500 determines the vehicle 100 as a delivery vehicle (FIG. 14, S102) and transmits an operation command to the vehicle 100 (FIG. 14, S103). The operation command transmitted to the vehicle 100 at S503 includes, for example, a command to move to the store A, a command to load the product A at the store A, a command to move from the store A to the request user's home, and a command to transfer the product A at the request user's home. Along with the operation command, for example, identification information of the delivery service, identification information of the request user, an address of the request user's home being the delivery destination, and an address of the store A being the collection place are also transmitted.

At S504 and S505, the center server 500 transmits vehicle key information of the vehicle 100 to the user terminal 200 of the request user and the user terminal 300 of the providing user of the store A (FIG. 15, S202). In the specific example, the vehicle key information notified to the request user and the vehicle key information notified to the providing user are different from each other. At S506, the center server 500 records the service status of the subject delivery service as "before dispatch" in the delivery management information table.

At S507, in response to receipt of the operation command from the center server 500, the vehicle 100 produces an operation plan. The operation plan includes, for example, a route from a current location to the store A, loading the package at the store A, a route from the store A to the request user's home, and transfer of the package at the request user's home. At S508, the vehicle 100 starts moving toward the store A according to the operation plan. At S509, the vehicle 100 arrives at the store A.

At S510, in order to load the package into the vehicle 100, the providing user at the store A, for example, inputs the vehicle key information of the vehicle 100 into the locking-unlocking device 150 of the vehicle 100. At S511, the vehicle 100 collates the input vehicle key information with vehicle key information registered in advance, and since both coincide with each other, authentication succeeds so that the door of the vehicle 100 is unlocked. At S512, the vehicle 100 transmits an unlocking notification to the center server 500. The unlocking notification includes, for example, identification information of the vehicle 100, vehicle key information of the vehicle 100, a timestamp, and location information of the vehicle 100.

At S513, since the center server 500 receives the unlocking notification from the vehicle 100 (FIG. 16, S302: YES) and the user who performed unlocking is determined to be the providing user, for example, from the vehicle key information included in the unlocking notification (FIG. 16, S303: NO), the center server 500 records a log of the unlocking notification in a vehicle lock-unlock recording table for the subject delivery service (FIG. 16, S304).

At S514, the product A is loaded into the vehicle 100 by the providing user. The product A is placed in the accommodation case 600. Hereinafter, the product A placed in the accommodation case 600 will be referred to as the package A. It is assumed that the accommodation case 600, for example, can be locked without using package key information. Further, it is assumed that package key information of the accommodation case 600 is managed by the center server 500 and that the providing user or the like has nothing to do with it.

At S515, in order to lock the door of the vehicle 100 after loading the package A into the vehicle 100, the providing, user at the store A, for example, inputs the vehicle key information of the vehicle 100 into the locking-unlocking device 150 of the vehicle 100. At S516, the vehicle 100 collates the input vehicle key information with vehicle key information registered in advance, and since both coincide with each other, authentication succeeds so that the door of the vehicle 100 is locked. At S517, the vehicle 100 transmits a locking notification to the center server 500. The locking notification includes, for example, identification information of the vehicle 100, vehicle key information of the vehicle 100, a timestamp, and location information of the vehicle 100.

At S518, since the center server 500 receives the locking notification from the vehicle 100 (FIG. 16, S302: NO, S305: YES) and the user who performed locking is determined to be the providing user, for example, from the vehicle key information included in the locking notification (FIG. 16, S306: NO), the center server 500 records a log of the locking notification in the vehicle lock-unlock recording table for the subject delivery service (FIG. 16, S307).

At S519, for example, the providing user at the store A inputs collection completion into the vehicle 100 so that a collection completion notification is transmitted from the vehicle 100 to the center server 500. The collection completion notification includes, for example, identification information of the delivery service and identification information (package ID) of the accommodation case 600 of the package A.

At S520, the center server 500 receives the collection completion notification from the vehicle 100 (FIG. 14, S106: YES) and updates the service status of the subject delivery service from "before dispatch" to "during delivery" in the delivery management information table. At S521, since the collection completion notification is received from the vehicle 100 (FIG. 15, S203: YES), the center server 500 performs an invalidation process of the vehicle key information of the vehicle 100 held by the providing user of the store A (FIG. 15, S204). For example, as the invalidation process, the center server 500 commands the vehicle 100 and the user terminal 300 of the providing user of the store A to delete the subject vehicle key information or record that the subject vehicle key information is invalid. Consequently, the providing user of the store A cannot lock or unlock the vehicle 100.

At S551 in FIG. 18B, the vehicle 100 moves from the store A and arrives at the request user's home being the delivery destination. At S552, in order to unload the package from the vehicle 100, the request user, for example, inputs the vehicle key information of the vehicle 100 into the locking-unlocking device 150 of the vehicle 100. At S553, the vehicle 100 collates the input vehicle key information with vehicle key information registered in advance, and since both coincide with each other, authentication succeeds so that the door of the vehicle 100 is unlocked.

At S554, the vehicle 100 transmits an unlocking notification to the center server 500. The unlocking notification includes, for example, identification information of the vehicle 100, vehicle key information of the vehicle 100, a timestamp, and location information of the vehicle 100. Since the center server 500 receives the unlocking notification from the vehicle 100 (FIG. 16, S302: YES) and the user who performed unlocking is determined to be the receiver (request user), for example, from the vehicle key information included in the unlocking notification (FIG. 16, S303: YES), the center server 500 does not record a log of the unlocking notification.

At S555, the request user unloads the package A from the vehicle 100 and receives the package A. At S556, the request user, for example, inputs receipt confirmation of the package A into the vehicle 100.

At S561, in order to lock the door of the vehicle 100, the request user, for example, inputs the vehicle key information of the vehicle 100 into the locking-unlocking device 150 of the vehicle 100. At S562, the vehicle 100 collates the input vehicle key information with vehicle key information registered in advance, and since both coincide with each other, authentication succeeds so that the door of the vehicle 100 is locked.

At S563, the vehicle 100 transmits a locking notification to the center server 500. Since the center server 500 receives the locking notification from the vehicle 100 (FIG. 16, S305: YES) and the user who performed locking is determined to be the receiver (request user), for example, from the vehicle key information included in the locking notification (FIG. 16, S306: YES), the center server 500 does not record a log of the locking notification.

At S571, in response to receipt of the input of the receipt confirmation of the package A from the request user at S556, the vehicle 100 transmits a delivery completion notification to the center server 500. The delivery completion notification includes, for example, identification information of the delivery service.

At S572, the center server 500 receives the delivery completion notification from the vehicle 100 (FIG. 14, S108: YES) and notifies the subject delivery completion to the collection-delivery management server 400 (FIG. 14, S109). At S573, the center server 500 updates the service status of the subject delivery service from "during delivery" to "delivery completed" in the delivery management information table.

At S581, since the delivery completion notification is received from the vehicle 100 (FIG. 17, S402: YES), the center server 500 transmits package key information of the package A to the user terminal 200 of the request user (FIG. 17, S403). At S582, the center server 500 changes the security level of the package A from "1" to "2" (FIG. 17, S404) and starts an invalidation timer (FIG. 17, S405). Consequently, the management authority of the package key information of the package A shifts to the request user so that, for example, after the shift, the center server 500 does not transmit the package key information of the package A to any users including a receiver.

At S583, since the delivery completion notification is received from the vehicle 100 (FIG. 15, S205: YES), the center server 500 performs an invalidation process of the vehicle key information of the vehicle 100 held by the request user (receiver) (FIG. 15, S206). For example, as the invalidation process, the center server 500 commands the vehicle 100 and the user terminal 200 of the request user to delete the subject vehicle key information or record that the subject vehicle key information is invalid. Consequently, the request user cannot lock or unlock the vehicle 100.

At S584, since the delivery completion notification is received from the vehicle 100 (FIG. 16, S308: YES), the center server 500 deletes the vehicle lock-unlock recording table for the subject delivery service (FIG. 16, S309). At S585, the request user opens the package A using the package key information of the package A notified from the center server 500.

At S591, the invalidation timer for the package key information of the package A expires in the center server 500 (FIG. 17, S406: YES). At S592, the center server 500, for example, deletes an entry about the package key information of the package A from the package key information management table so as to invalidate it (FIG. 17, S407).

In the specific example, the case is shown where there is one collection place. In the case where there are a plurality of collection places for a single delivery destination, the service is, for example, treated as a different delivery service per collection place. In this case, the center server 500 commands the vehicle 100 in an operation command to stop at respective collection places by a one-time operation for a plurality of delivery services. In response to receipt of the command from the center server 500, the vehicle 100 may produce an operation plan to stop at the respective collection places and load packages at the respective collection places. Consequently, the processes of S510 to S521 are performed at the collection places in the respective delivery services so that the packages loaded at the collection places can be delivered to a single delivery destination by a one-time operation of the vehicle 100. Alternatively, in the case where there are a plurality of collection places for a single delivery destination, this may be treated as a single delivery service. In this case, in the processes (FIGS. 14 to 17) for the single delivery service, the process about collection may be repeatedly performed as many times as the number of the collection places.

Operation and Effect of First Embodiment

In the first embodiment, in delivery of a package by the vehicle 100 capable of autonomous driving, an accommodation case forming the package is locked and delivered. Consequently, it is possible to suppress theft of the package during delivery. Further, the vehicle 100 itself in which the package is loaded is also locked during delivery, and persons who can perform unlocking of the vehicle 100 are limited to a providing user who loads the package into the vehicle 100, and to a receiver so that it is possible to suppress theft of the package during delivery.

In the first embodiment, package key information is managed by the center server 500, and when a notification of delivery completion of a package has arrived at the center server 500, the security level of package key information of the package is changed so that the management of the subject package key information shifts from the center server 500 to a receiver. Since the subject package key information is deleted in the center server 500 when an invalidation timer has expired, it is possible to limit the time period relating to the management of the package key information so that the load imposed on the management of the package key information in the center server 500 can be reduced.

In the first embodiment, when an operation command is transmitted to the vehicle 100, vehicle key information of the vehicle 100 is transmitted to a corresponding providing user and receiver, and then the vehicle key information is invalidated with respect to the corresponding providing user or receiver by collection completion or delivery completion. Consequently, it is possible to limit a person who can perform locking-unlocking of the vehicle 100, and the time period during which the person can perform locking-unlocking of the vehicle 100, so that the security of the vehicle 100 and a product loaded in the vehicle 100 can be protected.

In the first embodiment, the center server 500 records a log of locking-unlocking of the vehicle 100 when locking-unlocking of the vehicle 100 is performed by a person other than a receiver. That is, the processing for vehicle key information is changed between when locking-unlocking of the vehicle 100 is performed by a person other than a receiver and when locking-unlocking of the vehicle 100 is performed by a receiver. This is because since it is apparent that locking-unlocking of the vehicle 100 by a receiver is caused by transfer of a package to the receiver, if receipt confirmation or the like is obtained from the receiver, it suffices even if a log of locking-unlocking by the receiver is not recorded. On the other hand, there is a possibility that, for example, a malicious person is included in persons who perform locking-unlocking of the vehicle 100 during delivery, and when a package is lost during delivery, there is a possibility that the cause of the loss of the package can be determined by tracing the record of logs of locking-unlocking of the vehicle 100.

In the first embodiment, the record of a log of locking-unlocking of the vehicle 100 is deleted from the center server 500 by the completion of a delivery service. Consequently, it is possible to limit the time period during which the center server 500 holds the record of a log of locking-unlocking of the vehicle 100, so that the load of the center server 500 can be reduced.

In the first embodiment, when a delivery completion notification is received from the vehicle 100, the center server 500 changes the security level of package key information to start an invalidation timer and deletes the subject package key information after waiting for expiration of the invalidation timer. Consequently, for example, when a receiver has lost package key information in a time period from receipt of a package to unlocking of the package, if an invalidation timer has not expired, the center server 500 can notify the package key information to the receiver.

Others

In the first embodiment, triggered by receipt of a delivery completion notification from the vehicle 100 at the center server 500, for example, transmission of package key information to a receiver, changing the security level, of package key information, invalidation of vehicle key information to a receiver, and deletion of the record of a log of locking-unlocking of the vehicle 100 are performed, but not limited thereto. Since there are cases where there is a time lag between delivery completion by the vehicle 100 and receipt of a package by a receiver, these processes may be performed, triggered by receipt of receipt confirmation from the receiver at the center server 500.

In the first embodiment, when a collection completion notification is received from the vehicle 100, the center server 500 invalidates vehicle key information to a user terminal 300 of a providing user at a corresponding collection place, but the timing of invalidation of the vehicle key information to the user terminal 300 of the providing user is not limited thereto. For example, the vehicle key information to the user terminal 300 of the providing user may be invalidated when the center server 500 has received a delivery completion notification from the vehicle 100.

Recording Medium

A program that causes a computer or another machine or device (hereinafter referred to as the computer or the like) to realize the above-described issue control can be recorded in a recording medium that is readable by the computer or the like. By causing the computer or the like to read and execute the program of this recording medium, the computer functions as the center server 500.

Herein, the recording medium that is readable by the computer or the like represents a non-transitory recording medium that can store information such as data and program by an electrical, magnetic, optical, mechanical, or chemical action and can be read by the computer or the like. Of such recording media, the recording media that can be removed from the computer or the like include a flexible disk, a magneto-optical disk, CD-ROM, CD-R/W, DVD, a Blu-ray disc, DAT, 8 mm tape, a memory card such as a flash memory card, and so on. The recording, media fixed to the computer or the like include a hard disk, a read-only memory (ROM), and so on. Further, a solid-state drive (SSD) can be used as a recording medium removable from the computer or the like, or as a recording medium fixed to the computer or the like.

What is claimed is:

1. A delivery system comprising:
a vehicle configured to deliver a package placed in a case that is lockable-unlockable;
a storage unit configured to store key information of the case, the key information comprising first key information associated with a providing user and second key information associated with a receiving user;
a receiving unit configured to receive information about a delivery status of the package; and
a control unit configured to:
upon determination that the package has been loaded into the case by the providing user, invalidate the first key information; and
upon determination that the package has been unloaded from the case by the receiving user, invalidate the second key information.

2. The delivery system according to claim 1, wherein:
the case is a case that is configured to be unloaded from the vehicle and transferred to a receiver of the package; and
the control unit is configured to, when a notification of delivery completion or receipt confirmation of the package is received, transmit the key information to a terminal of the receiver of the package and invalidate the key information stored in the storage unit.

3. The delivery system according to claim 1, wherein:
the case is the vehicle itself, a package compartment provided in the vehicle, or a case placed in the vehicle; and the control unit is configured to transmit the key information to a terminal of a user who loads the package into the case, and to a terminal of a receiver of the package, the control unit configured to record locking-unlocking of the case when the locking-unlocking of the case is performed by a user other than the receiver of the package.

4. The delivery system according to claim 3, wherein the control unit is configured to, when a notification of delivery completion or receipt confirmation of the package is received, invalidate the key information transmitted to the terminal of the user who loads the package into the case, and to the terminal of the receiver of the package.

5. The delivery system according to claim 3, wherein the control unit is configured to, when a notification of delivery completion or receipt confirmation of the package is received, delete a record of the locking-unlocking of the case.

6. The delivery system according to claim 1, wherein the vehicle is configured to perform autonomous driving.

7. The delivery system according to claim 1, wherein the control unit is configured to change a security level of the key information according to the delivery status of the package.

8. The delivery system according to claim 7, wherein the control unit is configured to set a different security level of the key information between a case where locking-unlocking of the case is performed by a user other than a receiver of the package and a case where the locking-unlocking of the case is performed by the receiver of the package.

9. The delivery system according to claim 7, wherein the control unit is configured to set a different security level of the key information between time before a delivery completion notification of the package or a receipt confirmation of the package is received and time after the delivery completion notification of the package or the receipt confirmation of the package has been received.

10. A control method for a delivery system, the control method comprising:
by a management device that manages a vehicle that delivers a package placed in a case that is lockable-unlockable,
storing key information of the case into a storage unit, the key information comprising first key information associated with a providing user and second key information associated with a receiving user;
upon determination that the package has been loaded into the case by the providing user, invalidating the first key information; and
upon determination that the package has been unloaded from the case by the receiving user, invalidating the second key information.

11. The control method of claim 10, further comprising receiving information about a delivery status of the package and changing a security level of the key information according to the delivery status of the package.

12. The control method of claim 11, further comprising setting a different security level of the key information between a case where locking-unlocking of the case is performed by a user other than a receiver of the package and a case where the locking-unlocking of the case is performed by the receiver of the package.

13. The control method of claim 11, further comprising setting a different security level of the key information between time before a delivery completion notification of the package or receipt confirmation of the package is received and time after the delivery completion notification of the package or the receipt confirmation of the package has been received.

14. A server device comprising:
a storage unit configured to store key information of a case that is lockable-unlockable, the case configured such that a package that is delivered by a vehicle is placed in the case, the first key information associated with a providing user, and the second key information associated with a receiving user;
a receiving unit configured to receive information about a delivery status of the package; and
a control unit configured to:
upon determination that the package has been loaded into the case by the providing user, invalidate the first key information; and
upon determination that the package has been unloaded from the case by the receiving user, invalidate the second key information.

15. The server device of claim 14, wherein the control unit is configured to change a security level of the key information according to the delivery status of the package.

16. The server device of claim 15, wherein the control unit is configured to change a security level of the key information according to the delivery status of the package.

17. The server device of claim 15, wherein the control unit is configured to set a different security level of the key information between time before a delivery completion notification of the package or a receipt confirmation of the package is received and time after the delivery completion notification of the package or the receipt confirmation of the package has been received.

* * * * *